US012700145B2

(12) United States Patent
Carroll et al.

(10) Patent No.: US 12,700,145 B2
(45) Date of Patent: Aug. 4, 2026

(54) GENERATION OF CANDIDATE VIDEO ELEMENTS

(71) Applicant: Spotter, Inc., Culver City, CA (US)

(72) Inventors: David W. Carroll, Los Angeles, CA (US); Paul S. Bakaus, San Francisco, CA (US); Robert L. Gabel, Los Gatos, CA (US)

(73) Assignee: Spotter, Inc., Culver City, CA (US)

( * ) Notice: Subject to any disclaimer, the term of this patent is extended or adjusted under 35 U.S.C. 154(b) by 120 days.

(21) Appl. No.: 18/606,576

(22) Filed: Mar. 15, 2024

(65) Prior Publication Data

US 2025/0292442 A1     Sep. 18, 2025

(51) Int. Cl.
*G06F 40/40* (2020.01)
*G06T 11/00* (2006.01)

(52) U.S. Cl.
CPC .............. *G06T 11/00* (2013.01); *G06F 40/40* (2020.01); *G06T 2200/24* (2013.01)

(58) Field of Classification Search
CPC ...... G06F 40/40; G06T 11/00; G06T 2200/24
See application file for complete search history.

(56) References Cited

U.S. PATENT DOCUMENTS

| | | | |
|---|---|---|---|
| 12,299,796 B2 * | 5/2025 | Liu | G11B 27/28 |
| 2011/0254967 A1 * | 10/2011 | Filliettaz Iii | H04N 1/2166 |
| | | | 348/E5.042 |
| 2019/0236143 A1 * | 8/2019 | Fader | G06F 40/205 |
| 2021/0027065 A1 * | 1/2021 | Chung | H04N 21/4756 |

| | | | |
|---|---|---|---|
| 2024/0212265 A1 * | 6/2024 | Agarwal | G10L 15/1815 |
| 2024/0295953 A1 * | 9/2024 | Zakharov | G06V 10/82 |
| 2024/0394945 A1 * | 11/2024 | Orozco | G06V 10/70 |
| 2025/0005523 A1 * | 1/2025 | Katta | G06F 40/186 |
| 2025/0119625 A1 * | 4/2025 | Bhattacharyya | G06F 40/30 |
| 2025/0124622 A1 * | 4/2025 | Bhakthavatsalam | |
| | | | G06F 40/186 |
| 2025/0190488 A1 * | 6/2025 | Shin | G06F 40/56 |
| 2025/0201234 A1 * | 6/2025 | Singh | G06T 13/40 |
| 2025/0208971 A1 * | 6/2025 | Bryant | G06Q 50/14 |
| 2025/0232376 A1 * | 7/2025 | Tao | G06Q 40/06 |
| 2025/0246206 A1 * | 7/2025 | Duerr | G06F 40/40 |
| 2025/0252661 A1 * | 8/2025 | Wannerberg | G06T 17/00 |
| 2025/0284725 A1 * | 9/2025 | Cantrell | G06F 40/56 |
| 2025/0348331 A1 * | 11/2025 | Scheuermann | G06F 9/451 |
| 2025/0349054 A1 * | 11/2025 | Akerlund | G06V 10/235 |
| 2025/0349299 A1 * | 11/2025 | Hiray | G10L 17/06 |

FOREIGN PATENT DOCUMENTS

| | | | | | |
|---|---|---|---|---|---|
| CN | 114442802 A | * | 5/2022 | | G06F 9/451 |
| WO | WO-2021035227 A1 | * | 2/2021 | | G06V 20/41 |
| WO | WO-2025006089 A1 | * | 1/2025 | | G06F 40/35 |
| WO | WO-2025183682 A1 | * | 9/2025 | | G06V 20/49 |
| WO | WO-2025240207 A1 | * | 11/2025 | | G06T 11/00 |

* cited by examiner

*Primary Examiner* — Stephen S Hong
(74) *Attorney, Agent, or Firm* — Van Pelt, Yi & James LLP

(57) ABSTRACT

Embodiments of generation of candidate video elements are disclosed, including: receiving a requested video element type for a video creator user; deriving representative data associated with a set of seed videos; generating a prompt based at least in part on the requested video element type, the representative data associated with the set of seed videos, and a random input; inputting the prompt into a large language model that has been customized for the video creator user; and presenting a set of candidate video elements that has been output by the large language model.

18 Claims, 14 Drawing Sheets

100

300

Receive identifying information associated with a set of videos — 302

Determine respective view counts associated with the set of videos — 304

Determine an average view count based on the respective view counts — 306

Determine a subset of overperforming videos by comparing the respective view counts to the average view count — 308

800 —

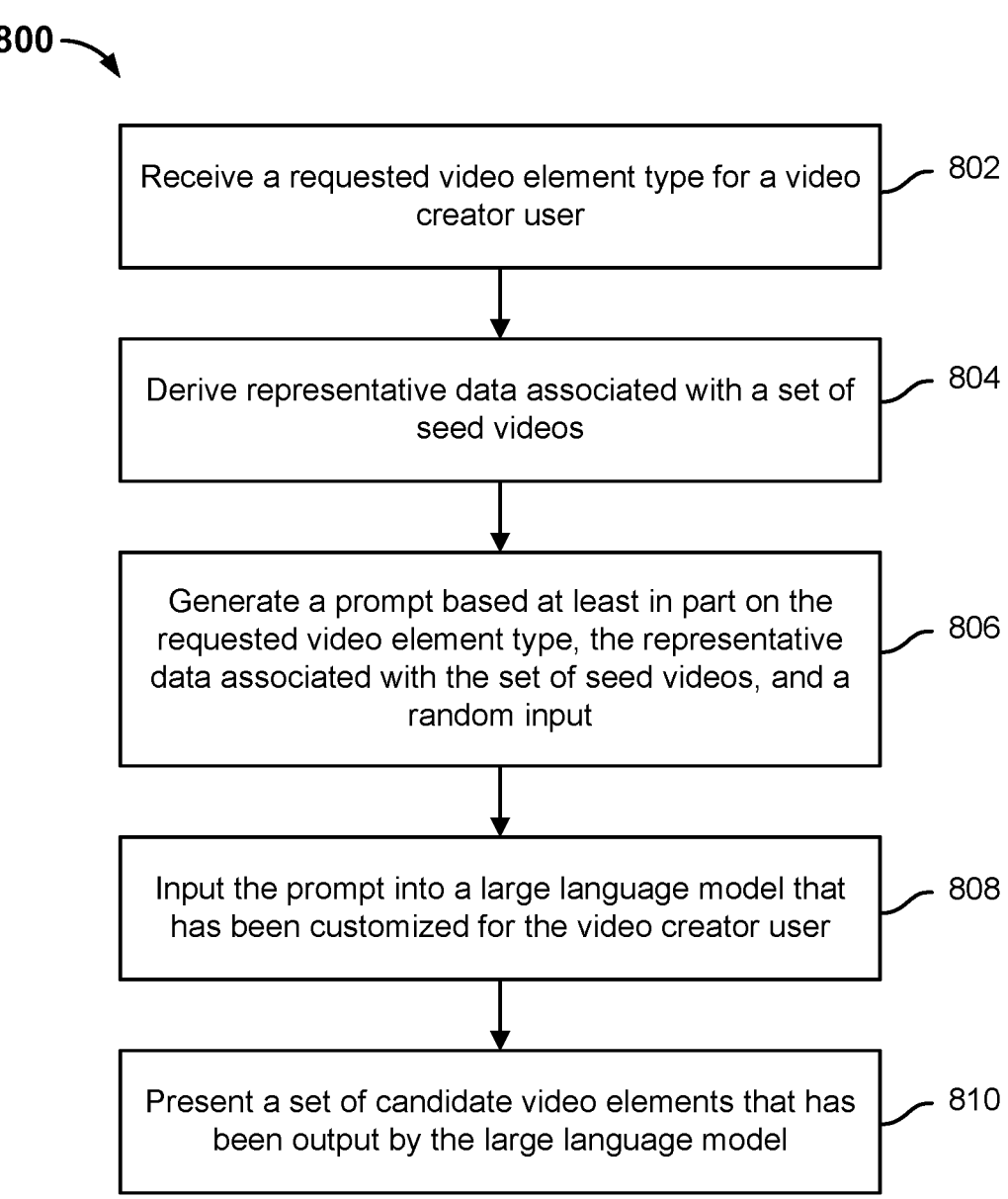

Receive a requested video element type for a video creator user — 802

Derive representative data associated with a set of seed videos — 804

Generate a prompt based at least in part on the requested video element type, the representative data associated with the set of seed videos, and a random input — 806

Input the prompt into a large language model that has been customized for the video creator user — 808

Present a set of candidate video elements that has been output by the large language model — 810

Present a user interface at a client device associated with a video creator user    902

Receive, via the user interface, selections of at least a requested video element type and a set of seed videos associated with a request for candidate video elements    904

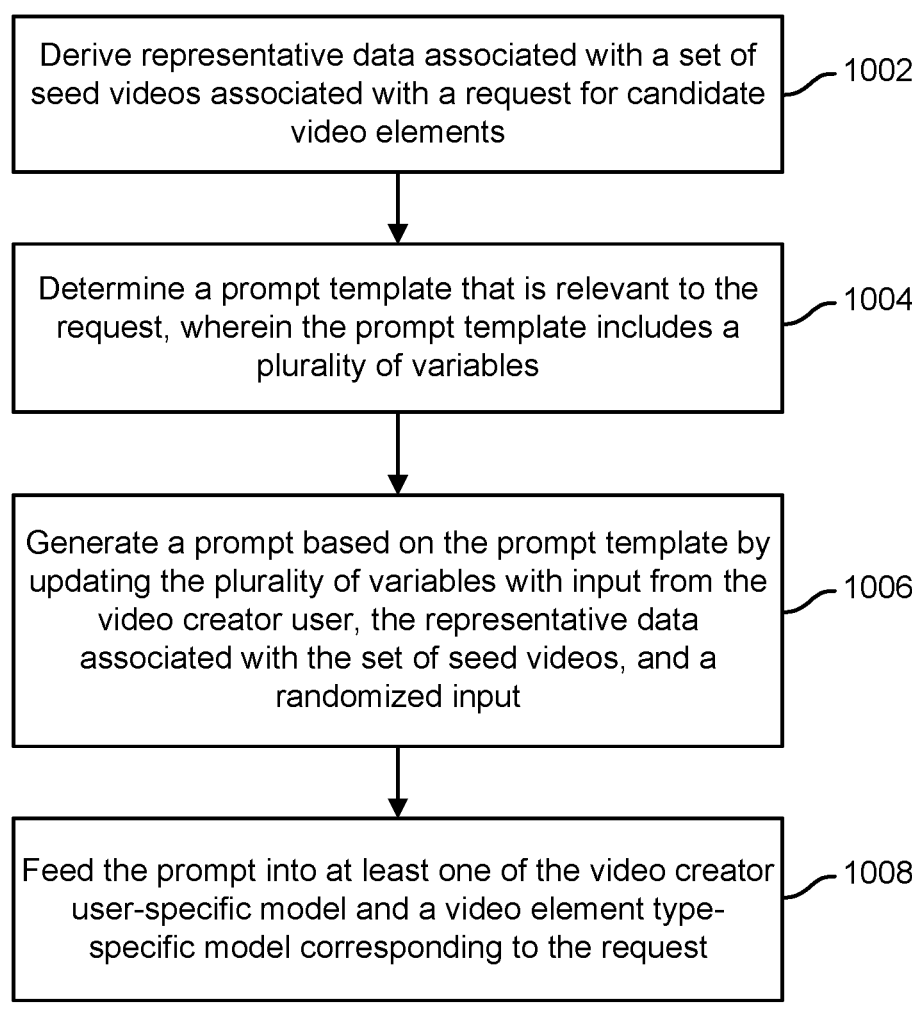

1000

Derive representative data associated with a set of seed videos associated with a request for candidate video elements — 1002

Determine a prompt template that is relevant to the request, wherein the prompt template includes a plurality of variables — 1004

Generate a prompt based on the prompt template by updating the plurality of variables with input from the video creator user, the representative data associated with the set of seed videos, and a randomized input — 1006

Feed the prompt into at least one of the video creator user-specific model and a video element type-specific model corresponding to the request — 1008

FIG. 10

GENERATION OF CANDIDATE VIDEO ELEMENTS

BACKGROUND OF THE INVENTION

Conventional general large language models (LLMs) are typically trained to generate output consistently in response to the same or similar input. This is due to the training data comprising of questions and expected answer pairings. As a result, a conventional LLM will interpolate from the training data in a predictable way. However, it may be desirable for a model's output to be creative rather than predictable or limited in scope.

BRIEF DESCRIPTION OF THE DRA WINGS

Various embodiments of the invention are disclosed in the following detailed description and the accompanying drawings.

FIG. 8 is a flow diagram showing an embodiment of a process for generating candidate video elements.

FIG. 10 is a flow diagram showing an example process for generating a prompt based on a received request for candidate video elements in accordance with some embodiments.

Figure 13A:
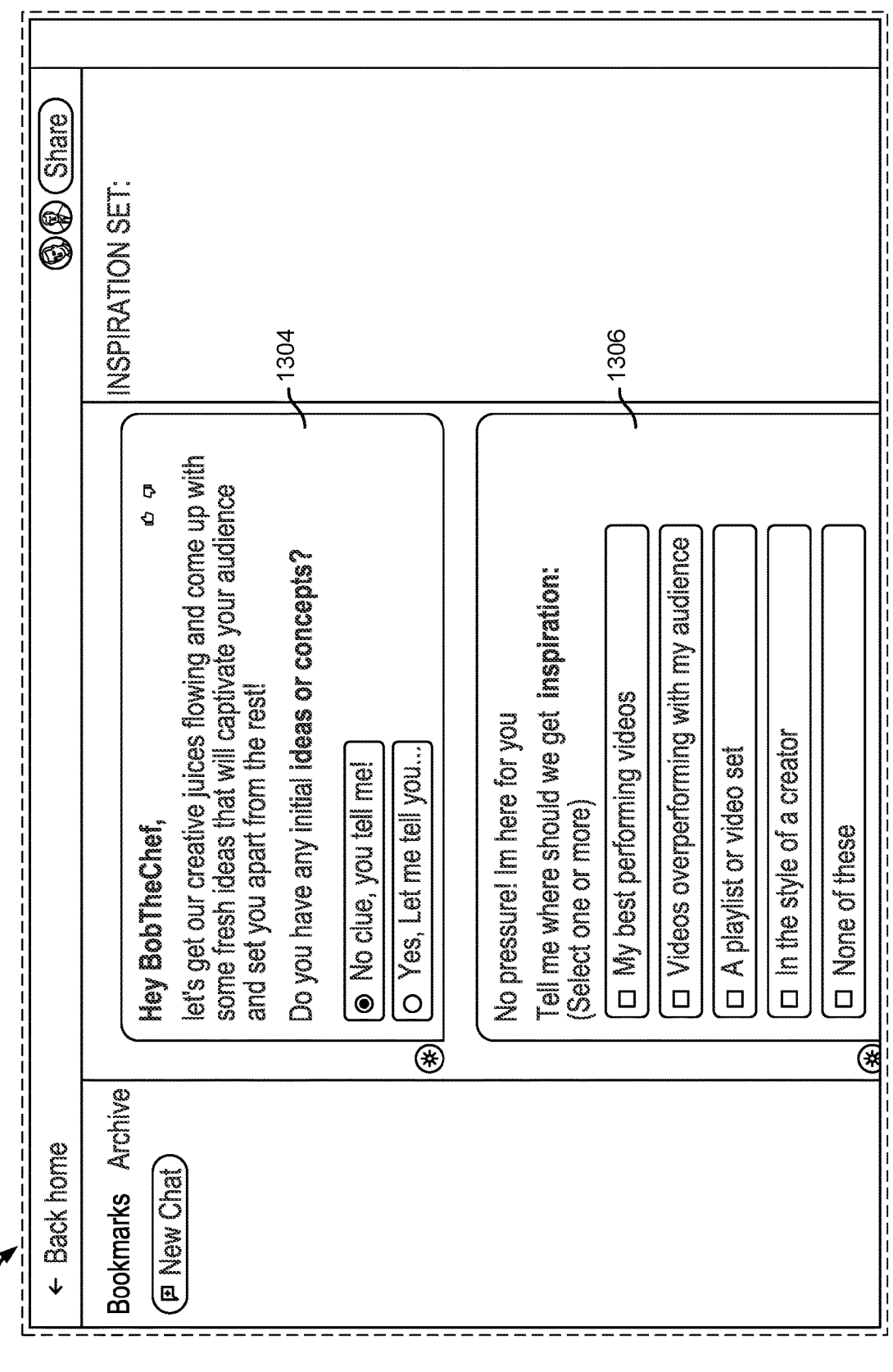
Figure 13B:
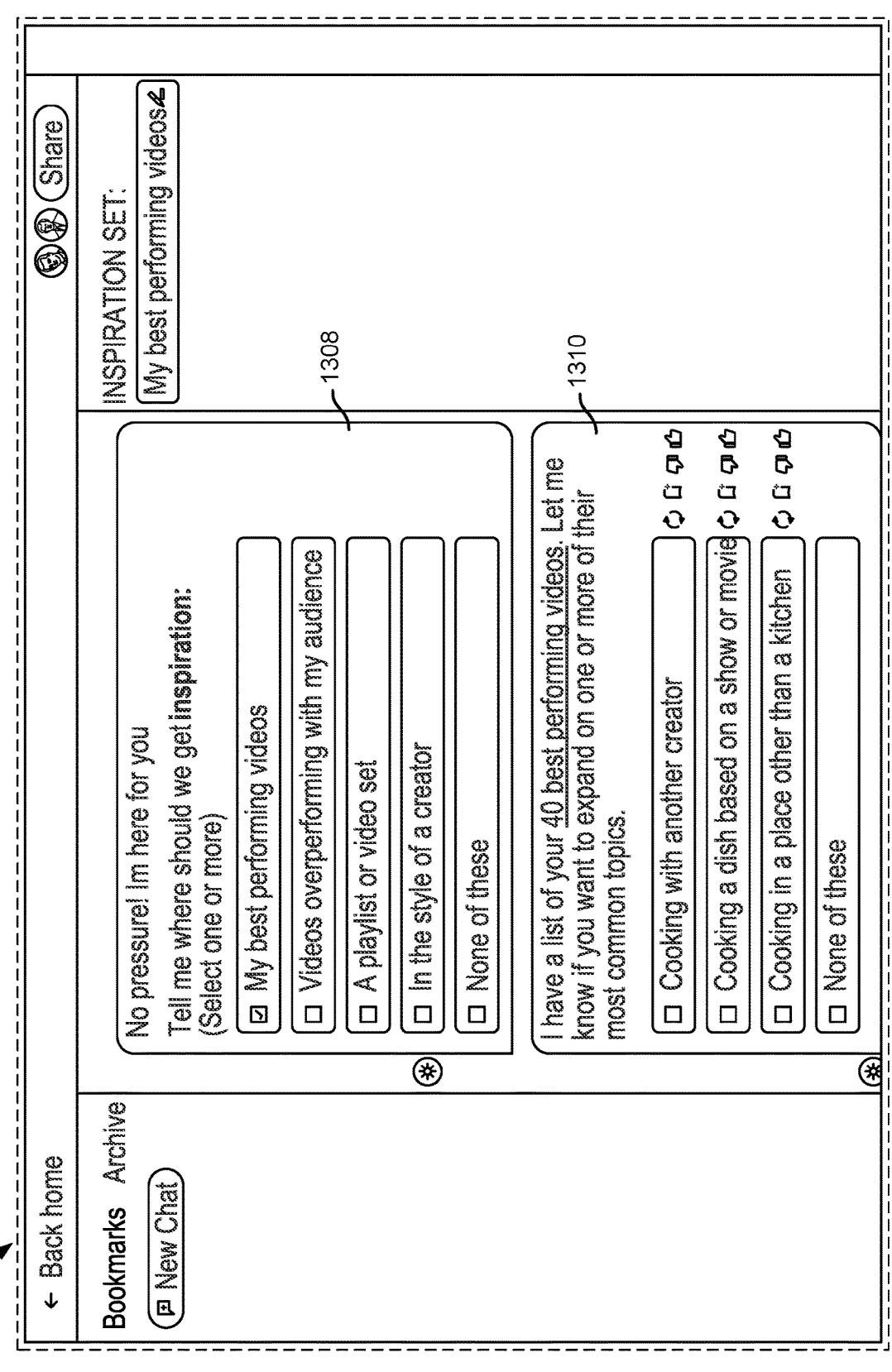

FIGS. 13A and 13B describe examples of a user interface for obtaining the submission of a request for candidate video elements for a video creator user.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of generation of candidate video elements are described herein. A requested video element type for a video creator user is received. In various embodiments, a "video creator user" is an entity comprising one or more individuals that produce video content. For example, the video creator user may have previously produced and recorded a set of videos that is shared with audiences at a video streaming platform. In various embodiments, a requested "video element type" comprises a type of element that is used in the development and/or the representation of a new video that is to be created by the video creator user. Examples of video element types include a beat sheet (e.g., an outline that describes each of one or more scenes to be filed for a video), a video title, and a thumbnail image to represent a video (e.g., and one that will be presented at a video streaming platform). In some embodiments, a set of seed videos, which represents videos whose content is to influence the generation of the candidate video elements corresponding to the requested video element type, is identified. Representative data is derived from the identified set of seed videos. Some examples of deriving representative data from a seed video may include obtaining a text transcription of the seed video, determining a logline associated with the seed video, determining a beat sheet associated with the seed video, a thumbnail image associated with the seed video, and one or more tags associated with the seed video. A prompt is generated based at least in part on the requested video element type, the representative data associated with the set of seed videos, and a random input. The prompt is then input into a large language model (LLM) that has been customized for the video creator user. Put another way, the LLM has been previously trained on training data that is derived from the video creator user's previously created video(s) and/or biography information associated with the video creator user. In response to the prompt, a set of candidate video elements corresponding to the requested video element type is output by the LLM and then presented at a user interface. Each "candidate video element" can be an option for the video creator user to use in the development/creation of a new video. As will be described in further detail below, because the LLM has been trained on the particular video creator user's video content, the LLM is configured to generate output that is aligned with that user's creative history. Furthermore, at least in part due to the random input that is included in the prompt to the LLM, the output of the LLM will also be diverse over time but consistent with the scope of the video creator user's creative history.

Figure 1:
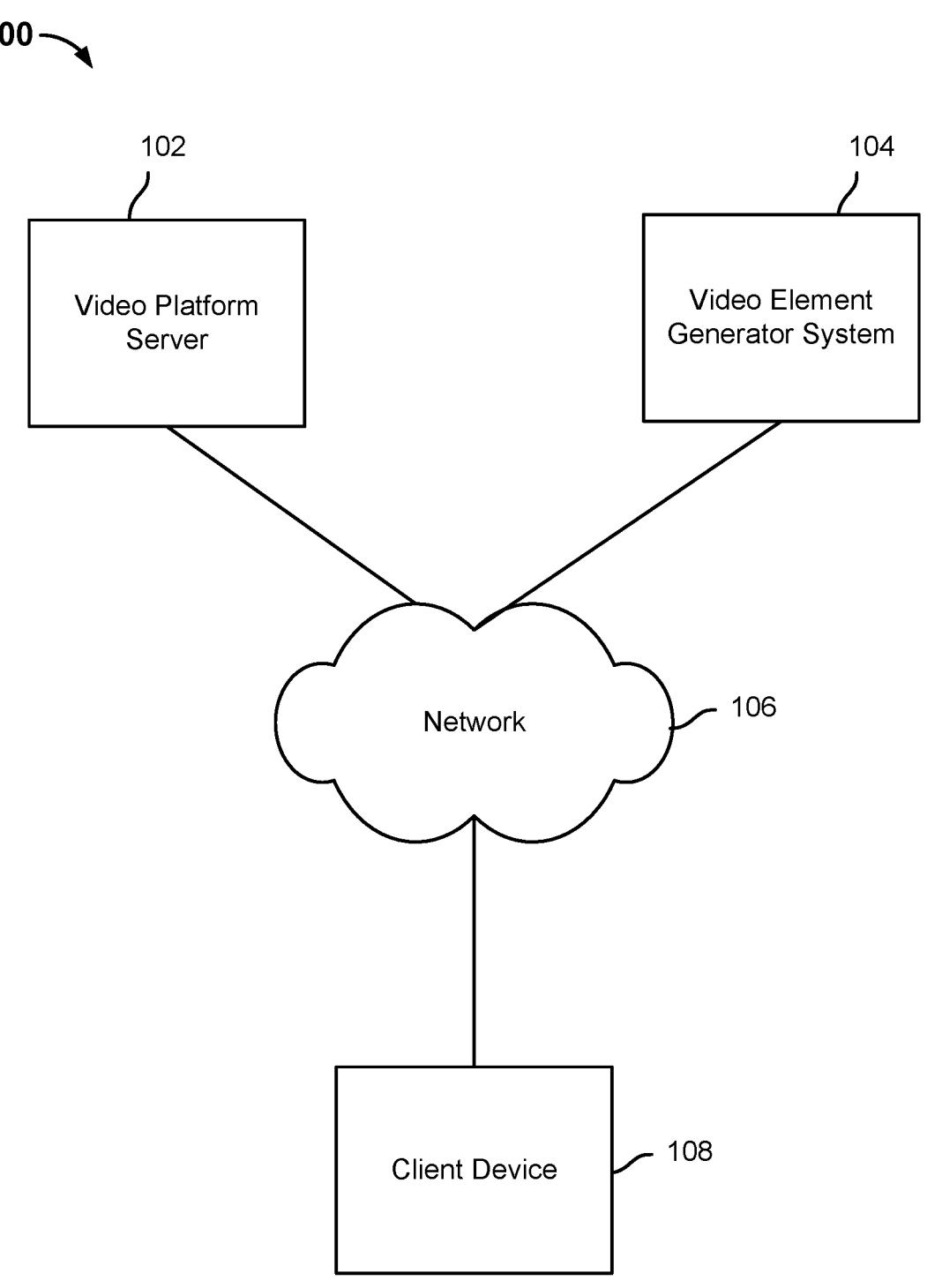
FIG. 1 is a diagram showing an embodiment of a system for generating candidate video elements.

FIG. 1 is a diagram showing an embodiment of a system for generating candidate video elements. As shown in FIG. 1, system 100 includes video platform server 102, video element generator system 104, network 106, and client device 108. Network 106 can be implemented using one or more data and/or telecommunications networks. Video platform server 102, video element generator system 104, and client device 108 can communicate to each other over network 106.

Video platform server 102 is configured to host videos on its online video sharing platform. In various embodiments, video platform server 102 is configured to store the underlying files associated with a video that is uploaded by a video creator user, as well as track (relatively) static video metadata such as, for example, the identity of the video creator user, tags/keywords associated with the video, the thumbnail image that is used to represent the video, the title of the video, and the upload date of each video. For example, the static metadata associated with a video may be uploaded by the respective video creator user to video platform server 102. As mentioned above, a "video creator user" comprises one or more individuals that develop and produce videos that are shared on video platform server 102. For example, a video creator user may include the same or different individuals that produce videos and/or appear in the videos. In the example of the platform comprising an online video hosting platform, videos may be organized into "channels," where a channel is associated with one or more videos and a video creator user may be associated with one more channels of videos. In the example of the platform comprising an online video hosting platform, platform server 102 is also configured to capture information associated with users that interact with the videos. In various embodiments, video platform server 102 is also configured to track dynamic video metadata such as user interaction with the videos. For example, dynamic metadata associated with a video may be monitored and maintained by video platform server 102 over time. Examples of such dynamic metadata include the view count of a video (e.g., the number of the times that the video has been viewed), the timestamps of the views of the video, the number of subscribers to a video creator user/video channel associated with a video, the comments that users have made on the video, and/or the number of likes that users have indicated on the video. In various embodiments, platform server 102 is configured to assign a user identifier (ID) to each user (e.g., an "audience member") that interacts with a video. In various embodiments, a user ID comprises an anonymized string that uniquely represents an individual.

Video element generator system 104 is configured to customize a model corresponding to each video creator user. At training time, video element generator system 104 is configured to train an LLM corresponding to each of one or more video creator users. To train an LLM corresponding to a video creator user, video element generator system 104 is configured to first generate training data corresponding to that video creator user. In various embodiments, video element generator system 104 is configured to query video platform server 102 for profile information associated with the video creator user, at least a portion of the historical videos that the video creator user has shared on the platform, and (e.g., static and dynamic) metadata associated with at least a portion of the historical videos that the video creator user has shared on the platform. For example, all of the video creator user's historical videos can be obtained by video element generator system 104 for the purpose of generating training data. In another example, the dynamic metadata of the user interaction with the video creator user's videos are first used to selectively determine a subset of the most viewed within a given time window ("overperforming") videos to obtain from video platform server 102 for the purpose of generating training data. Video element generator system 104 is then configured to derive representative data associated with the video creator user data and/or related video data obtained from video platform server 102. In a first example, deriving representative data includes generating text transcriptions of the audio stream corresponding to a video and then deriving a logline for the video based on the text transcription. In various embodiments, a "logline" comprises a short summary of a piece of media. In a second example, deriving representative data includes analyzing the uploaded description/metadata of a video and/or sampling the audio stream of the video to identify the cast members that are present in the video. Video element generator system 104 is configured to train a base LLM based on training data that includes at least data associated with the video creator user that was directly obtained from video platform server 102, the derived representative data, and/or data associated with the video creator user that was obtained from a source other than video platform server 102 (e.g., a social media platform). For example, the base LLM could be obtained from a third-party model generator. Specific examples of third-party models may include, e.g., OpenAI's ChatGPT, Google's PaLM, BigScience Large Open-science Open-access Multilingual Language Model (BLOOM), Meta's Llama2, Mistral, and Falcon. The result of training the base LLM with the video creator user-specific training data is that the resulting model is tailored to the historical video creation style, historical video themes/concepts, and/or biographic attributes of the video creator user. In some embodiments, in response to a prompt, a video creator user-specific model (e.g., LLM) could output text-based descriptions of video ideas, themes, and/or concepts that are aligned with the video creator user's historical creative output.

In some embodiments, video element generator system 104 is also configured to, at training time, customize models to generate particular types of video elements. Examples of video element types include a beat sheet (e.g., an outline that describes each of one or more scenes to be filmed for a video), a video title, and a thumbnail image to represent a video (e.g., and one that will be presented at a video streaming platform). In some embodiments, video element generator system 104 is also configured to generate one or more separate models for each of the beat sheet video element type, the video title video element type, and the thumbnail image video element type, and video element generator system 104 is also configured to apply such models to determine candidate video elements for a variety of video creator users. To train a model for outputting candidate beat sheets, in some embodiments, video element generator system 104 is configured to obtain historical videos across a variety of video creator users from video platform server 102 and/or another video source and generate text transcriptions. Video element generator system 104 is then configured to derive beat sheets from the text transcription corresponding to each historical video and then generate a data structure for each beat sheet. Video element generator system 104 is configured to train a base LLM based on training data comprising the derived beat sheets to obtain a beat sheet-specific model. To train a model for outputting candidate video title video elements, in some embodiments, video element generator system 104 is configured to obtain the titles of historical videos across a variety of video creator users from video platform server 102 and/or another video source and generate text transcriptions. Video element generator system 104 is configured to train a base LLM based on training data comprising the obtained video titles to obtain a video title-specific model. In contrast, in some embodiments, video element generator system 104 is configured to generate a respective thumbnail image video element type model for each video creator user because the model is to generate images with the likeness of that particular user. To train a model for outputting candidate thumbnail images for a particular video creator user, in some embodiments, video element generator system 104 is configured to obtain thumbnail images corresponding to historical videos associated with that video creator user from video platform server 102 and/or another source of images of that video creator user. Video element generator system 104 is then configured to train a base text-to-image model (e.g., Stable Diffusion) based on the obtained images of the video creator user as well as original illustrations or other images created for training style, composition, color palette, etc.

After the video creator user-specific models and the video element type-specific models have been trained, different prompt templates can be tested against each model to determine a subset of prompt templates that result in the model outputs that best meet a set of prompt evaluation criteria. Testing a prompt template may include feeding a prompt into a model and then determining the difference between the expected output and the actual output, and then revising the prompt template based on the determined difference. In various embodiments, each prompt template includes a random variable whose value can be randomly generated/selected for each instance of generating a prompt from that template, as will be described below.

Video element generator system 104 is further configured to, at inference time, process requests for candidate video elements corresponding to a specified video element type and a specified video creator user. For example, a video creator user can initiate a request to receive candidate video elements corresponding to a specified video element type by providing inputs at a user interface provided by video element generator system 104. The inputs for a request for candidate video elements (e.g., to facilitate in the creation of new videos) may include one or more of the following: identifying information associated with the video creator user, descriptions of the video creator user and/or his/her style and background, a specified video element type, (optionally) one or more other parameters/criteria (e.g., a story template, a genre, at least a portion of a video title, at least a portion of a beat sheet), to constrain the candidate video elements that should be generated/presented, and identifying information associated with a set of seed videos. As mentioned above, "a set of seed videos" represents videos whose content is to influence (e.g., serve as inspiration to) the generation of the candidate video elements corresponding to the requested video element type. In response to the request, video element generator system 104 is configured to obtain the video files and/or metadata of the set of seed videos from video platform server 102 and/or another video source and then derive representative data from the obtained data. Examples of representative data that can be derived from the set of seed videos and/or their metadata include one or more of the following: text transcription, thumbnail images, tags, video titles, beat sheets (e.g., which can be decomposed from the text transcriptions), and loglines (e.g., which can be analyzed from the text transcriptions). Other information may include images from video frames or creator specific photos or illustrations that can be used to personalize the generated outputs, including text and image (e.g., such as the concept art, storyboards, or thumbnails). Video element generator system 104 is configured to select a prompt template that was previously generated corresponding to a trained model that is related to the request. Models that are related to the request can include the model (e.g., LLM) that is specific to the video creator user specified in the request and also the model that is specific to the video element type specified in the request. The obtained prompt template is populated with (e.g., variables/placeholders within the template are replaced with) one or more of the representative data derived from the seed videos, any optional user provided parameters, and a randomly selected value/input to generate a prompt. Examples of the random input can be location, time of day, situation, emotion, subject, and video length. Video element generator system 104 is configured to input the prompt into a corresponding one of the video creator user-specific model and the video element type-specific model to receive an output. The output from the prompted model can then be used to populate a prompt template (e.g., with another random input) corresponding to the other model to generate the second prompt. Video element generator system 104 is configured to input the second prompt into the second model to receive candidate video elements that are of the type that is requested and also within the historical creative scope of the video creator user.

Due at least to the addition of the random input that is selected for each instance of prompt generation and the dynamically derived representative data of the identified set of seed videos, the model(s) are to generate outputs that are constrained by the historical creative scope of the video creator user but that are nevertheless varied over time even for requests for the same video creator and/or requested video element type. As will be described in further detail below, candidate video elements that are output by the model(s) can first be evaluated by video element generator system 104 against a set of criteria and/or historical model outputs before they are presented at a user interface.

While video creator user-specific models are described above as being separate from the video element type-specific models, in some embodiments, each video element type-specific model (e.g., for generating beat sheets, video titles, and thumbnail images) can be trained on both the video element type-specific training data and the training data that was described for customizing the video creator user-specific model to generate video element type-specific models that are also customized for each video creator user.

As described in system 100, varied/creative candidate video elements can be generated for a video creator user to assist in the ideation of new video content that is also bespoke to the historical videos that have been created by that user.

Figure 2:
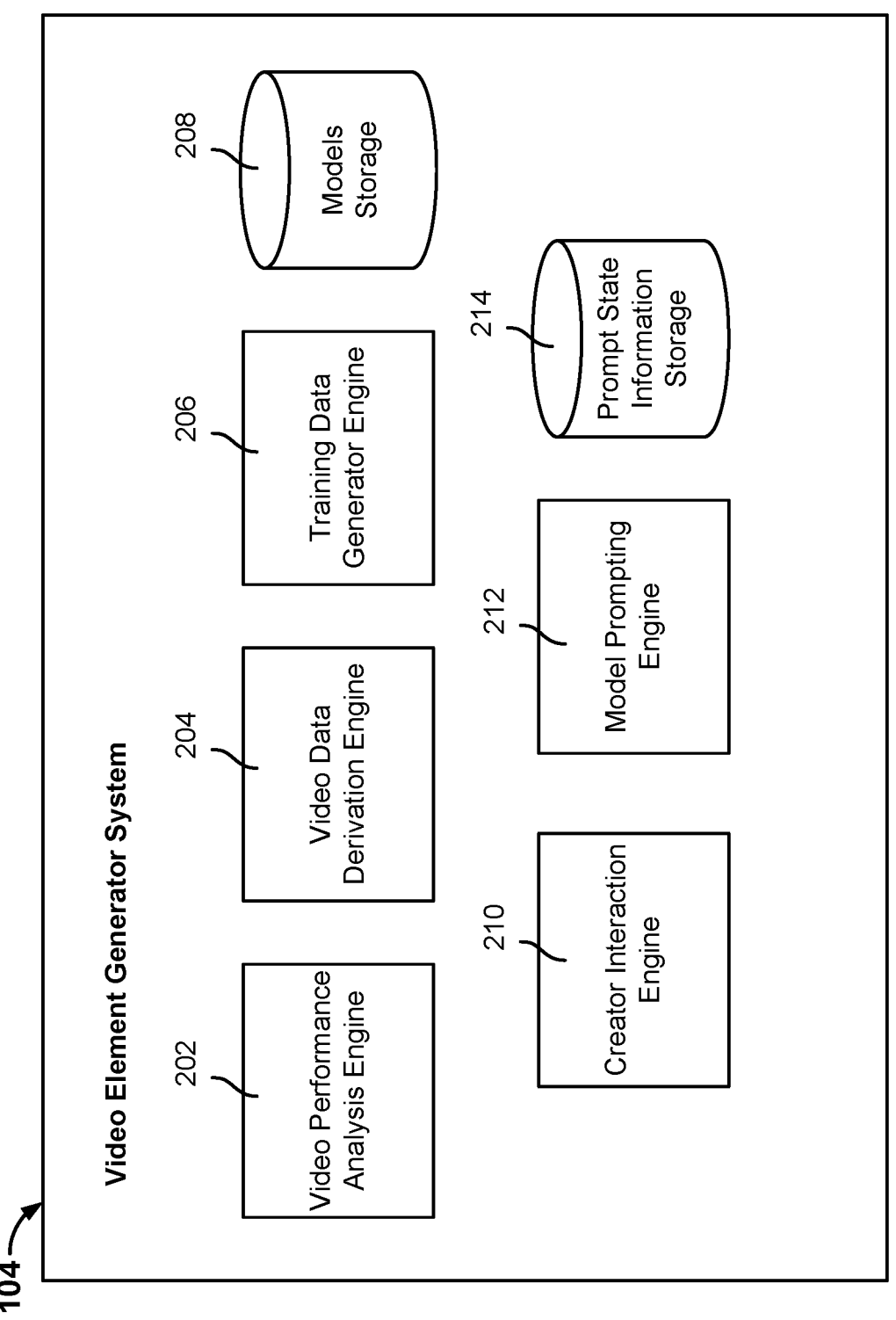
FIG. 2 is a diagram showing an example of a video element generator system in accordance with some embodiments.

FIG. 2 is a diagram showing an example of a video element generator system in accordance with some embodiments. In some embodiments, video element generator system 104 of system 100 of FIG. 1 can be implemented using the example described in FIG. 2. In FIG. 2, the example video element generator system includes video performance analysis engine 202, video data derivation engine 204, training data generator engine 206, models storage 208, creator interaction engine 210, model prompting engine 212, and prompt state information storage 214. Each of video performance analysis engine 202, video data derivation engine 204, training data generator engine 206, models storage 208, creator interaction engine 210, model prompting engine 212, and prompt state information storage 214 may be implemented using hardware or software.

Video performance analysis engine 202 is configured to determine the performance metrics of videos based on dynamic metadata that is obtained from a video platform server. In various embodiments, the performance metrics of videos are determined for a set of videos that are grouped together (e.g., by their video creators). In some embodiments, video performance analysis engine 202 is configured to query a video platform server (e.g., video platform server 102 of FIG. 1) for a time series of audience interaction metrics per each interval of time of each video from a set of videos (e.g., videos that have been created by a specified video creator user). For example, the time series of audience interaction metrics of a video comprises the respective view counts of a video per each day within a given window of time (e.g., the period between the upload date of the video to the video platform server and the following seven or some other predetermined number of days). Video performance analysis engine 202 is configured to determine the aggregate audience interaction metric of each video in the set of videos across their given windows of time and then determine the average aggregate audience interaction metric for all the videos in the set. Then, video performance analysis engine 202 is configured to determine the subset of videos of the set whose respective aggregate audience interaction metric exceeds the average aggregate audience interaction metric. This subset of videos whose aggregate audience interaction metrics exceed the average aggregate audience interaction metrics are determined to be meeting the criterion for being identified as "overperforming" videos from the set. For example, the videos of a certain set (e.g., the body of videos that are uploaded by the same video creator to the video platform server) whose aggregate view counts during the first week of its upload to the platform exceed the average view count of that set's videos during their respective first weeks are determined to be "overperforming." "Overperforming" videos can be assumed to be more popular and/or sensational and potentially, more desirable to service as references for new videos to be created. A first example use of identifying "overperforming" videos of a particular video creator user is to identify a subset of that creator's videos to use to derive training data from to train a video creator user-specific model. A second example use of identifying "overperforming" videos from a particular set of videos (e.g., belonging to a specified video creator user and/or that have been viewed by a particular video creator user's audience members) is to identify a subset of videos to use as "seed videos" and from which to derive representative data in the process of generating candidate element responses to a request.

Video data derivation engine 204 is configured to generate representative data from video data obtained from a video platform server. As will be described in further detail below, the representative data that is derived from historical video data obtained from a video platform server can be used for various applications. In a first example application, the derived representative video data can be used to serve as training data to train models such as video creator user-specific models and/or video element type-specific models. In a second example application, the derived representative video data can be determined from selected seed videos in response to a request for candidate video elements and as such, the derived representative video data can be used to generate prompts to input into the trained models. In a third example application, the derived representative data of different videos can be compared to each other as proxies for the similarity between the videos from which they were derived.

In some embodiments, video data derivation engine 204 is configured to derive summaries (which are sometimes referred to as "loglines") of videos. In some embodiments, a model that has been trained on text transcriptions video (e.g., movie, televisions shows) and their corresponding published (e.g., human written) loglines is obtained. In some embodiments, video data derivation engine 204 is configured to obtain video data (e.g., video files and audio files) of an identified set of videos (e.g., the overperforming videos of a specified video creator user) from a video platform server and then generate a text transcription of each such video. Then, video data derivation engine 204 is configured to input the text transcription of a video into this logline model to obtain a logline corresponding to the video. As suggested above, a video's logline can be compared to the loglines of other videos as a technique for determining the similarity between the videos.

In some embodiments, video data derivation engine 204 is configured to identify cast members (e.g., the names or roles of individuals that appear) in videos. In a first example, video data derivation engine 204 is configured to identify cast members in a video by analyzing the video title, video metadata, and/or user posted comments to detect the presence of specified names/roles. In a second example, video data derivation engine 204 is configured to identify cast members in a video by comparing an audio sample of a historical cast member's speech/voice in a video creator user's video to the audio track of a video to determine for the presence of that cast member's speech/voice in the video.

Training data generator engine 206 is configured to generate training data that is to be used to train models for outputting candidate video elements associated with a specified video creator user in response to requests for candidate video elements. In various embodiments, training data generator engine 206 is configured to generate training data for training a video creator user-specific model. In some embodiments, training data generator engine 206 generates training data for training a video creator user-specific model including by querying a video platform server and/or another source for profile/biographical information/metadata (e.g., name, age, location, descriptions of the creator and/or their work) related to the video creator user. In some embodiments, training data generator engine 206 can further generate training data by querying video data derivation engine 204 to generate representative data associated with historical videos that have been created by that video creator user, as described above. In some embodiments, training data generator engine 206 generates training data for training video element type-specific models such as a beat sheet model, a thumbnail image model, and a video title model. In some embodiments, training data generator engine 206 generates training data for training a beat sheet model by deriving beat sheets from obtained videos (e.g., from a video platform server). In some embodiments, training data generator engine 206 is configured to obtain video data (e.g., video files and audio files) of an identified set of reference videos (e.g., the videos of various video creator users) from a video platform server and then generate a text transcription of each such reference video. Then, video data derivation engine 204 is configured to input the text transcription of a reference video into obtained scene decomposition and sentiment analysis model(s) to obtain a corresponding beat sheet, which comprises a series of text snippets/scenes (from the video's text transcription) with accompanied sentiment analysis associated with each text snippet/scene. In some embodiments, each beat sheet may also be generated to include a story template name (e.g., a hero's journey, save the cat, food challenge) that describes the general arc of the story within the video. In some embodiments, each beat sheet is stored in a corresponding data structure. For example, a beat sheet data structure may include plot points, scene-related sentiments, transitions and corresponding timestamps, and themes. In some embodiments, training data generator engine 206 generates training data for training a thumbnail image model by aggregating historical thumbnail images that were used to represent the creator user's historical videos (e.g., that are shared at a video platform server) and/or other images that include the creator user's likeness (e.g., face and/or at least portion of the body that the creator user wishes to appear within future thumbnail images). In some embodiments, training data generator engine 206 generates training data for training a video title model by aggregating video titles in the style and/or format (e.g., within a given range of length and/or using a given style of punctuation) of video titles that historically appear at a video platform server.

In some embodiments, in addition to generating training data for training various types of models, training data generator engine 206 is further configured to also train respective base models with the training data to obtain video creator user-specific models and/or video element type-specific models.

After the video creator user-specific models and/or video element type-specific models have been trained, various prompt templates are tested against each of the models. For example, prompt engineering is performed on each model to determine a prompt template that results in an output from the model that meets a set of criteria for desirable output. In various embodiments, a prompt template comprises text, variables/placeholders that are to be completed with representative data that is to be derived from a selected set of seed videos, and a random input. The random input in a prompt template is to be updated for each instance of prompting a model based on a given prompt template.

Models storage 208 is configured to store the parameters (e.g., weights) of the models that have been trained with at least the training data that is generated, at least in part, by training data generator engine 206. For example, models storage 208 is configured to store parameters of video creator user-specific models and video element type-specific models (e.g., beat sheet model(s), thumbnail image model (s), and video title model(s)). In various embodiments, models storage 208 is further configured to store prompt template(s) that have been determined for each particular model.

Creator interaction engine 210 is configured to receive a request to generate candidate video elements of a specific video element type for a specified video creator user. In various embodiments, creator interaction engine 210 is configured to further receive, as part of a request, a selected set of seed videos to influence the generation of the candidate video elements. In some embodiments, creator interaction engine 210 is configured to further receive, as part of a request, zero or more additional user inputs to constrain the types of the candidate video elements that are to be generated. Put another way, the request to generate candidate video elements of a specific video element type for a specified video creator user in light of a set of seed videos (e.g., inspiration videos) is a request for video element options/ideas (e.g., aspects of new videos to be made) that align with the specified video creator user's own style but that are influenced/constrained by the style/attributes of the selected set of seed videos (e.g., overperforming videos of other video creator users) and/or constrained by any other user optionally submitted inputs.

In some embodiments, creator interaction engine 210 is configured to present an interactive user interface through which a user (e.g., the video creator user themselves or someone that is working with the video creator user) can input/specify the parameters of such a request, including the relevant video creator user for which the candidate element types are to be generated, the candidate element type (e.g., a beat sheet, a thumbnail image, a video title) of the candidate elements, a selection of a set of seed videos, and optionally, additional inputs (e.g., a video theme, a video concept, a video genre, a setting for a video). In some embodiments, creator interaction engine 210 is configured to present candidate seed videos from which the request submission user can select seed videos to include in a request for candidate video elements. For example, creator interaction engine 210 is configured to query video performance analysis engine 202 to identify "overperforming videos" (or other types of videos whose audience interaction metrics meet a given criteria) that were created by the video creator user for which the request is submitted, that were created by other video creator users, and/or that are viewed by the audience members of the video creator user for which the request is submitted. In some embodiments, creator interaction engine 210 is configured to query video data derivation engine 204 to return representative data that is derived from the selected set of seed videos associated with a request. In a first example, the request submission user interface that is provided by creator interaction engine 210 may comprise an interactive tool that can prompt the request submission user to enter the parameters of a request through a chat input field and also present generated candidate video elements into the chat window. In this chat format, the request submission user can also provide feedback (e.g., desired modifications) to a presented set of candidate video elements through the chat input field and this feedback can be used to generate the next set of candidate video elements. In a second example, the request submission user interface that is provided by creator interaction engine 210 may comprise a series of forms through which the request submission user can input values and make selections (e.g., of videos to select as seed videos) to serve as parameters of a request for candidate video elements.

Model prompting engine 212 is configured to generate prompts for trained models based on requests for candidate video elements. In various embodiments, model prompting engine 212 is configured to generate prompts to a video creator user-specific model and/or a video element type-specific model (e.g., which is stored at models storage 208) by updating/populating corresponding prompt templates to those model(s) using the parameters that were provided for a request for candidate video elements that were received by creator interaction engine 210. For example, any one or more of the following possible parameters of or derived from the parameters of a request for candidate video elements may be used to replace/update variables in a prompt template (e.g., that was previously determined for a corresponding model): the specified video creator user, the specified candidate element type (e.g., a beat sheet, a thumbnail image, a video title) of the candidate elements, representative data derived from the selected set of seed videos, and optionally, additional inputs (e.g., a story template, a genre, at least a portion of a video title, at least a portion of a beat sheet). As mentioned above, each prompt template includes at least a random variable and each instance of a prompt that is generated from that template will include a corresponding randomly generated value in place of the random variable. Put another way, different instances of prompts that are generated from the same prompt template will likely include different randomly generated values/inputs and therefore, cause a corresponding model to output different output. Example types of random variables may be related to trends, news, a time of day, a location, a video length, and a situation. As such, a prompt that is generated by model prompting engine 212 may include text from a prompt template (e.g., the phrasing of the requested output as a question and including the requested number of candidate video elements), parameters (or data derived thereof) from a request for candidate video elements, profile/biographical information associated with the video creator user, and at least a randomly generated value.

Model prompting engine 212 is configured to input/feed a generated prompt to a trained video creator user-specific model and/or a video element type-specific model to receive outputs of candidate video elements. In some embodiments, to receive outputs of candidate generated video elements, depending on what kind of training data is used to train the models, model prompting engine 212 may be configured to prompt a series of trained models by generating a first prompt for a first model using a prompt template for that first model, using the output from the first model to generate a second prompt for a second model, and so forth until candidate generate video elements are obtained.

Model prompting engine 212 is configured to store each set of the candidate video elements at prompt state information storage 214. In some embodiments, model prompting engine 212 is configured to maintain state information pertaining to each video creator user and optionally, each session. For example, sets of candidate video elements that have been generated in response to a request for candidate video elements for a specified video creator user can be stored as a tree structure, where candidate video elements that branch off from previously generated candidate video elements in view of a modifier submitted by the user forms child node(s) relative to the parent node(s) of the previously generated candidate video elements. In some embodiments, model prompting engine 212 could also store state information corresponding to each candidate video element such as, for example, an evaluation score, the prompt that was used to generate it, and whether the candidate was presented to the request submission user. One reason to store candidate video elements that have been generated in response to a request is to maintain a history of previously generated candidate video elements to prevent redundant candidate video elements from being presented for the same request. Another reason to store historically generated candidate video elements is to use such video elements and the request submission user's interaction with them as additional training data to update the video creator user-specific and video element type-specific models.

In various embodiments, before model prompting engine 212 presents a new set of candidate video elements that were generated in response to a request, model prompting engine 212 first evaluates the candidate video elements using a set of evaluation criteria and/or compares the candidate video elements to previously presented candidate video elements. In some embodiments, model prompting engine 212 is configured to score each candidate video element based on its originality, novelty, flexibility, elaboration, complexity, surprisingness, risk-taking, transcendence, and emotionality, for example, and then determine whether the score exceeds a threshold. The candidate video element is then only presented at the user interface if its score exceeds the threshold. In some embodiments, model prompting engine 212 can also compare the new candidate video elements to previously generated candidate video elements that are stored at prompt state information storage 214 to determine whether any of them have already been previously presented to the request submission user and therefore, should not be redundantly presented. In some embodiments, if model prompting engine 212 determines that less than a predetermined number of candidate video elements meet the criteria for being presented (e.g., have scores over the threshold and/or are not redundant with previously presented candidate video elements), model prompting engine 212 can generate new prompts using the parameters of the request and with new random values to prompt the model(s) again for additional candidate video elements.

In some embodiments, after model prompting engine 212 presents a set of candidate video elements at the user interface, the request submission user may provide feedback such as modifiers to the candidate video elements. In response to receiving user feedback, model prompting engine 212 is configured to generate new prompts that will be fed into the models to receive new candidate video element outputs. For example, a new prompt may include the parameters of the request, the user feedback, a new random value, and/or at least a previously generated candidate video element for which the feedback was received. As described above, model prompting engine 212 can proceed to store the new candidate video elements at prompt state information storage 214 and then evaluate them before presenting at least some of them, as described above. Model prompting engine 212 can continue to receive user feedback to new sets of candidate video elements and then generate, evaluate, and then present them as described above, until the user ends the process (e.g., because they are satisfied with the candidate video elements that they have received).

As described herein, creative and diverse output are obtained from model(s) that have been trained on the video data of a particular video creator user through at least the continuous training of the model with new video data that has been produced by that video creator user, the selection of different seed videos that populate the prompts to the model(s), and the randomly selected inputs that are included in each prompt to the model(s).

Figure 3:
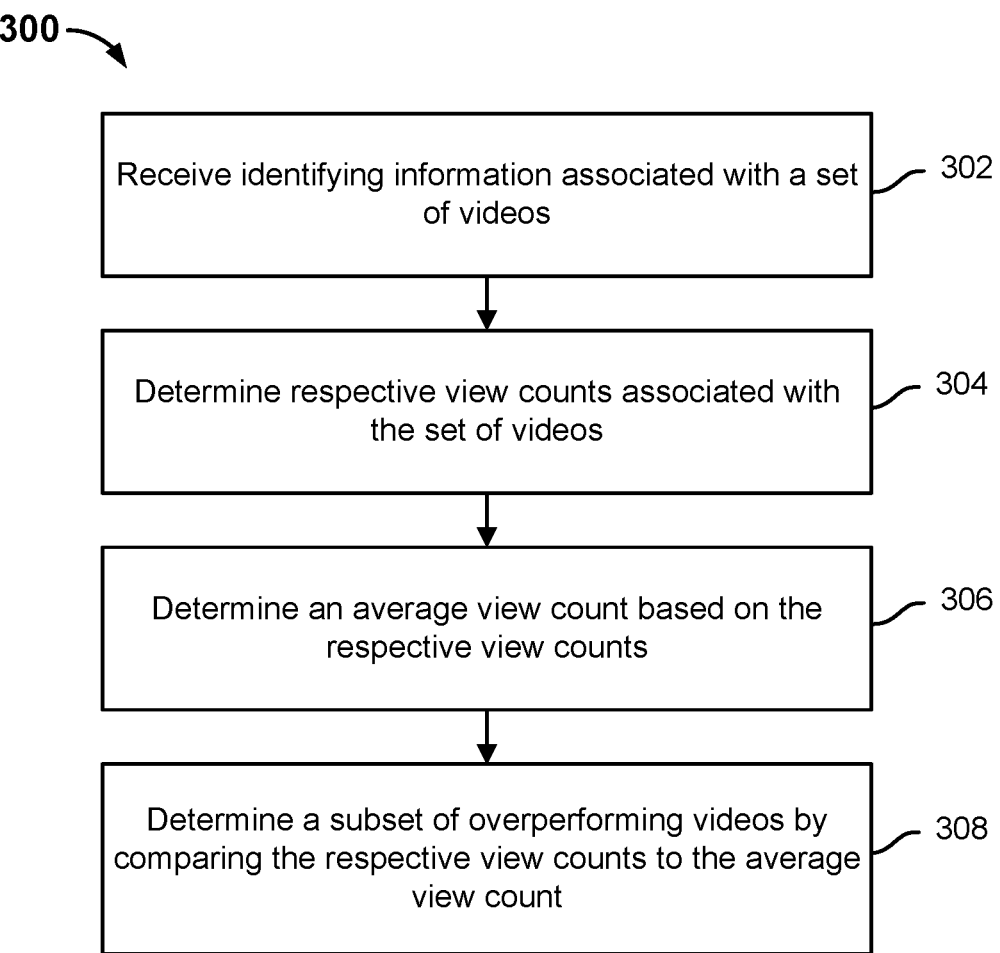
FIG. 3 is a flow diagram showing an example process for analyzing the performance of a set of videos in accordance with some embodiments.

FIG. 3 is a flow diagram showing an example process for analyzing the performance of a set of videos in accordance with some embodiments. In some embodiments, process 300 may be implemented, at least in part, at video element generator system 104 of FIG. 1.

Process 300 is an example process for identifying a subset of videos that are "overperforming" relative to other videos in the same set based on their relative view counts. In a first example, process 300 can be used to identify overperforming videos belonging to a video creator user to use to train the video creator user-specific model. In a second example, process 300 can be used to identify overperforming videos belonging to one or more video creator users to use as a set of seed videos towards generating candidate video elements in response to a request for candidate video elements.

At 302, identifying information associated with a set of videos is received. The identifying information is received (e.g., from a user interface) and is used to identify the set of videos at a video platform server. For example, the identifying information comprises identifying information associated with one or more video creator users and/or a piece of video metadata (e.g., a topic, a genre, a trend, a hashtag).

At 304, respective view counts associated with the set of videos are determined. A "view count" is the number of times that an audience member has viewed at least a predetermined portion of a video. A "cumulative view count" is the total view count on a video during a predetermined window of time. For example, a predetermined window of time is between a start time (e.g., the time after which the video was uploaded/shared on a video platform server) and an end time (e.g., after the first seven days of the video's upload). The video platform server, which maintains dynamic video metadata such as a video's view count is queried to obtain the view count information.

At 306, an average view count is determined based on the respective view counts. The average of the videos' cumulative view counts is determined.

At 308, a subset of overperforming videos is determined by comparing the respective view counts to the average view count. Those videos whose respective cumulative view counts that are greater than the average view count are identified as "overperforming." As such, an "overperforming" video is a video with a cumulative view count (or other level of audience interaction) that is relatively greater than the average view count of the videos in the set over the time window defined by a predetermined start and end time (e.g., over the first seven days from the video's upload) and is therefore not just a video with potentially a large absolute cumulative view count. Due to its relatively high audience interaction in the period immediately after its release, an "overperforming" video can be considered to be a particularly successful video and the traits thereof are desirable to influence the generation of candidate video elements for subsequent videos.

Figure 4:
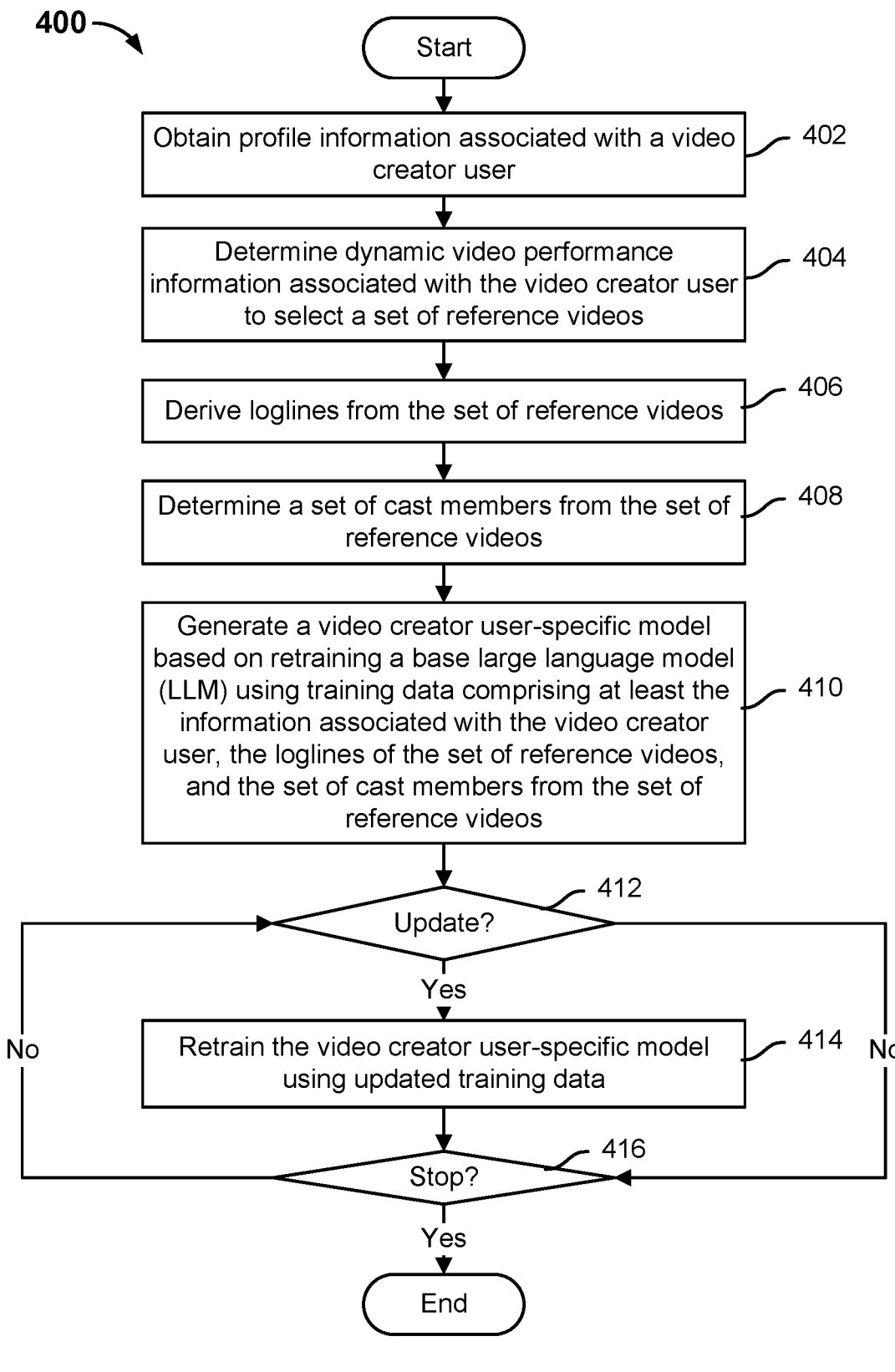
FIG. 4 is a flow diagram showing an example process for training a video creator user-specific model in accordance with some embodiments.

FIG. 4 is a flow diagram showing an example process for training a video creator user-specific model in accordance with some embodiments. In some embodiments, process 400 may be implemented, at least in part, at video element generator system 104 of FIG. 1.

At 402, profile information associated with a video creator user is obtained. Profile information associated with the video creator user for which an LLM is being trained can be obtained from one or more sources. Examples of sources of static profile information include the video platform server at which the video creator user uploads video, a social networking platform at which the video creator user maintains profile information, and/or a user interface through which the video creator user directly submits his/her/their own profile information. Examples of profile information include a description of the type of videos (e.g., humorous skits, instructional videos, challenge videos, comparison videos, etc.) that the user creates, a description of the individuals that contribute to the videos, a location of the video creator user, and information regarding the audience of the video creator user (e.g., the number of subscribers, the number of aggregate view counts across all of the user's videos).

At 404, dynamic video performance information associated with the video creator user is determined to select a set of reference videos. Dynamic video performance information is determined based on the dynamic audience interaction information with the historical videos that have been uploaded by the video creator user to a video platform server. For example, the dynamic audience interaction information comprises view counts on each video. In some embodiments, a process such as process 300 (as described above in FIG. 3) can be used to determine "overperforming" videos among historical videos that have been uploaded by the video creator user to the video platform server and those videos can be selected to serve as the set of reference videos. In some other embodiments, all historical videos that have been uploaded by the video creator user to the video platform server are selected as the set of reference videos regardless of each video's performance in relation to other videos in the set.

At 406, loglines from the set of reference videos are derived. For example, as mentioned above, a logline (a short text-based summary) of each reference video is determined by generating a text transcription of each reference video and then inputting the text transcription into an obtained model that is configured to output a logline based on the text transcription. As such, a logline is determined from the text transcription of each reference video.

At 408, a set of cast members from the set of reference videos is determined. For example, as mentioned above, the cast members that appear in each reference video can be determined by analyzing each reference video's title/metadata and/or comparing audio samples of each reference video's stored speech of each known cast member.

At 410, a video creator user-specific model is generated based on retraining a base large language model (LLM) using training data comprising at least the information associated with the video creator user, the loglines of the set of reference videos, and the set of cast members from the set of reference videos. As such, training data that comprises at least the data associated with the video creator users and/or their historical videos that are determined at steps 402, 404, 406, and 408 is used to train a base LLM. For example, a base LLM can be a general purpose LLM that is obtained from a third-party. After being retrained on the video creator user training data, the updated base model will be configured to generate text-based output that is influenced and constrained by the profile attributes and video history of that video creator user.

At 412, whether updated training data is available to update the video creator user-specific model is determined. In the event that updated training data is available to update the video creator user-specific model, control is transferred to 414. Otherwise, in the event that updated training data is not available to update the video creator user-specific model, control is transferred to 416. Periodically (e.g., every month) and/or in response to an event, the current version of the video creator user-specific model can be trained on updated training data. For example, the updated training data (e.g., such as the types that have been described at steps 402, 404, 406, and 408) can be derived from any new profile information and/or new videos that have been uploaded by the video creator user to the video platform server.

At 414, the video creator user-specific model is retrained using updated training data. The current version of the video creator user-specific model can then be retrained on the new training data to result in a new version of the video creator user-specific model.

At 416, whether the video creator user-specific model is to be continued to be updated is determined. In the event that the video creator user-specific model is to be continued to be updated, control is returned to 412. Otherwise, in the event that the video creator user-specific model is no longer to be updated, process 400 ends.

Figure 5:
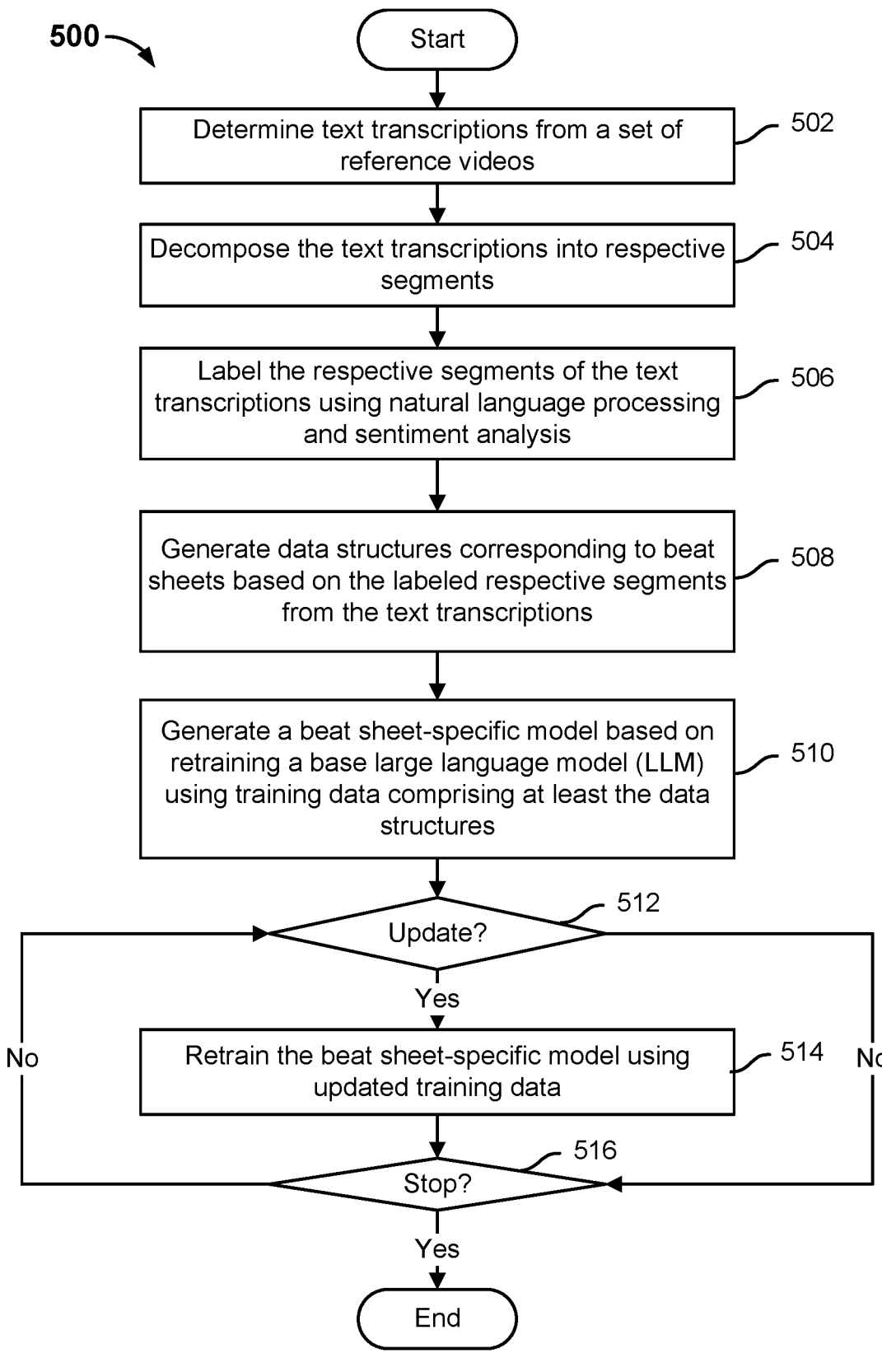
FIG. 5 is a flow diagram showing an example process for training a beat sheet-specific model in accordance with some embodiments.

FIG. 5 is a flow diagram showing an example process for training a beat sheet-specific model in accordance with some embodiments. In some embodiments, process 500 may be implemented, at least in part, at video element generator system 104 of FIG. 1.

At 502, text transcriptions are determined from a set of reference videos. The set of reference videos are historical videos that have been shared at a video platform server. For example, the set of reference videos can be created by one or more video creator users. A corresponding text transcription is derived from the audio stream of each such reference video.

At 504, the text transcriptions are decomposed into respective segments. Each video's text transcription is then decomposed into a series of text segments, where each text segment includes the text and start/end timestamps within the video of a corresponding scene. For example, the text transcription can be decomposed into segments by inputting it into a model that is trained to decompose text into scene-related text segments.

At 506, the respective segments of the text transcriptions are labeled using natural language processing and sentiment analysis. Each text segment of a video's text transcription is analyzed via natural language processing and sentiment analysis to determine labels that describe at least the type of scene and the sentiment associated with that corresponding scene. The analysis of the video text transcription may also determine a story style associated with the video.

At 508, data structures corresponding to beat sheets are generated based on the labeled respective segments from the text transcriptions. A data structure that is to represent a beat sheet of a reference video is generated based on the text segments decomposed from the video's text transcription, the per text segment/scene's determined labels, and/or the determined story style. Put another way, a data structure that describes the beat sheet of a reference video will include descriptions/labels, the start/end timestamps, and text that is included in each successive scene within the reference video.

At 510, a beat sheet-specific model is generated based on retraining a base large language model (LLM) using training data comprising at least the data structures. As such, training data that comprises at least the beat sheet data structures is used to train a base LLM. For example, a base LLM can be a general purpose LLM that is obtained from a third-party. After being retrained on the beat sheet training data, the updated base model will be configured to generate (e.g., structured) text-based outputs in a beat sheet format in a way that is influenced and constrained by the beat sheet data structures of the training data.

At 512, whether updated training data is available to update the beat sheet-specific model is determined. In the event that updated training data is available to update the beat sheet-specific model, control is transferred to 514. Otherwise, in the event that updated training data is not available to update the beat sheet-specific model, control is transferred to 516. Periodically (e.g., every month) and/or in response to an event, the current version of the beat sheet-specific model can be trained on updated training data. For example, the updated training data (e.g., such as the types that have been obtained via steps 502, 504, 506, 508, and 510) can be derived from new reference videos.

At 514, the beat sheet-specific model is retrained using updated training data. The current version of the beat sheet-specific model can then be retrained on the new training data to result in a new version of the beat sheet-specific model.

At 516, whether the beat sheet-specific model is to be continued to be updated is determined. In the event that the beat sheet-specific model is to be continued to be updated, control is returned to 512. Otherwise, in the event that the beat sheet-specific model is no longer to be updated, process 500 ends.

Figure 6:
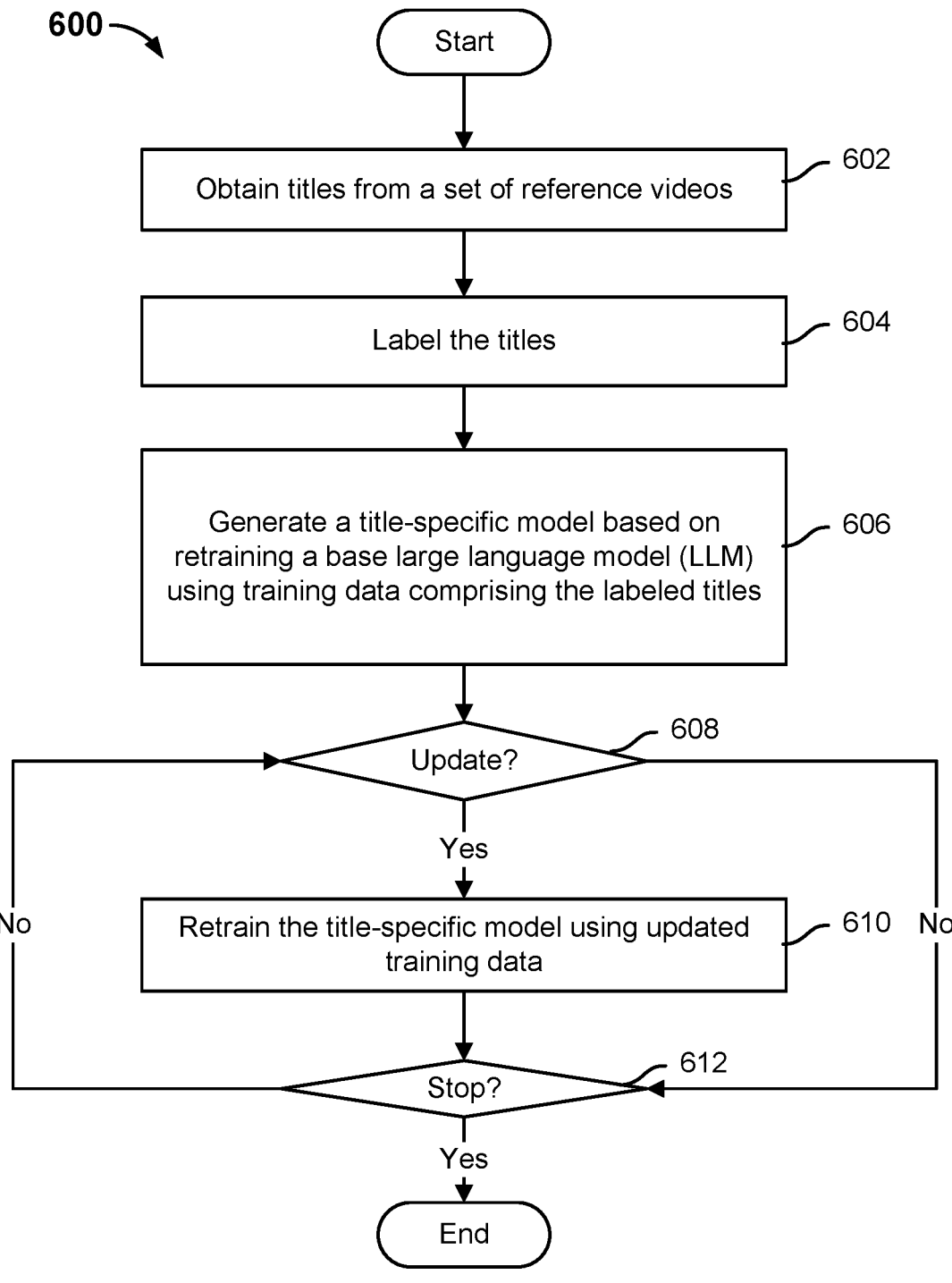
FIG. 6 is a flow diagram showing an example process for training a video title-specific model in accordance with some embodiments.

FIG. 6 is a flow diagram showing an example process for training a video title-specific model in accordance with some embodiments. In some embodiments, process 600 may be implemented, at least in part, at video element generator system 104 of FIG. 1.

At 602, titles are obtained from a set of reference videos. The set of reference videos are historical videos that have been shared at a video platform server. In some embodiments, the set of reference videos can be selected due to their titles conforming to desired templates/styles of punctuation, length, and/or other appeal. In some embodiments, the set of reference videos can be selected as overperforming videos using a process such as process 300 of FIG. 3.

At 604, the titles are labeled. The titles can be analyzed using an obtained model that is configured to label video titles with the conveyed emotion(s), audience demographics, video content types, etc.

At 606, a video title-specific model is generated based on retraining a base large language model (LLM) using training data comprising at least the data structures. As such, training data that comprises at least the labeled video titles is used to train a base LLM. For example, a base LLM can be a general purpose LLM that is obtained from a third-party. After being retrained on the labeled video titles training data, the updated base model will be configured to generate text-based outputs in a video title format in a way that is influenced and constrained by the video titles of the training data.

At 608, whether updated training data is available to update the video title-specific model is determined. In the event that updated training data is available to update the video title-specific model, control is transferred to 610. Otherwise, in the event that updated training data is not available to update the video title-specific model, control is transferred to 612. Periodically (e.g., every month) and/or in response to an event, the current version of the video title-specific model can be trained on updated training data. For example, the updated training data (e.g., such as the types that have been obtained via steps 602, 604, and 606) can be derived from new reference videos.

At 610, the video title-specific model is retrained using updated training data. The current version of the video title-specific model can then be retrained on the new training data to result in a new version of the video title-specific model.

At 612, whether the video title-specific model is to be continued to be updated is determined. In the event that the video title-specific model is to be continued to be updated, control is returned to 608. Otherwise, in the event that the video title-specific model is no longer to be updated, process 600 ends.

Figure 7:
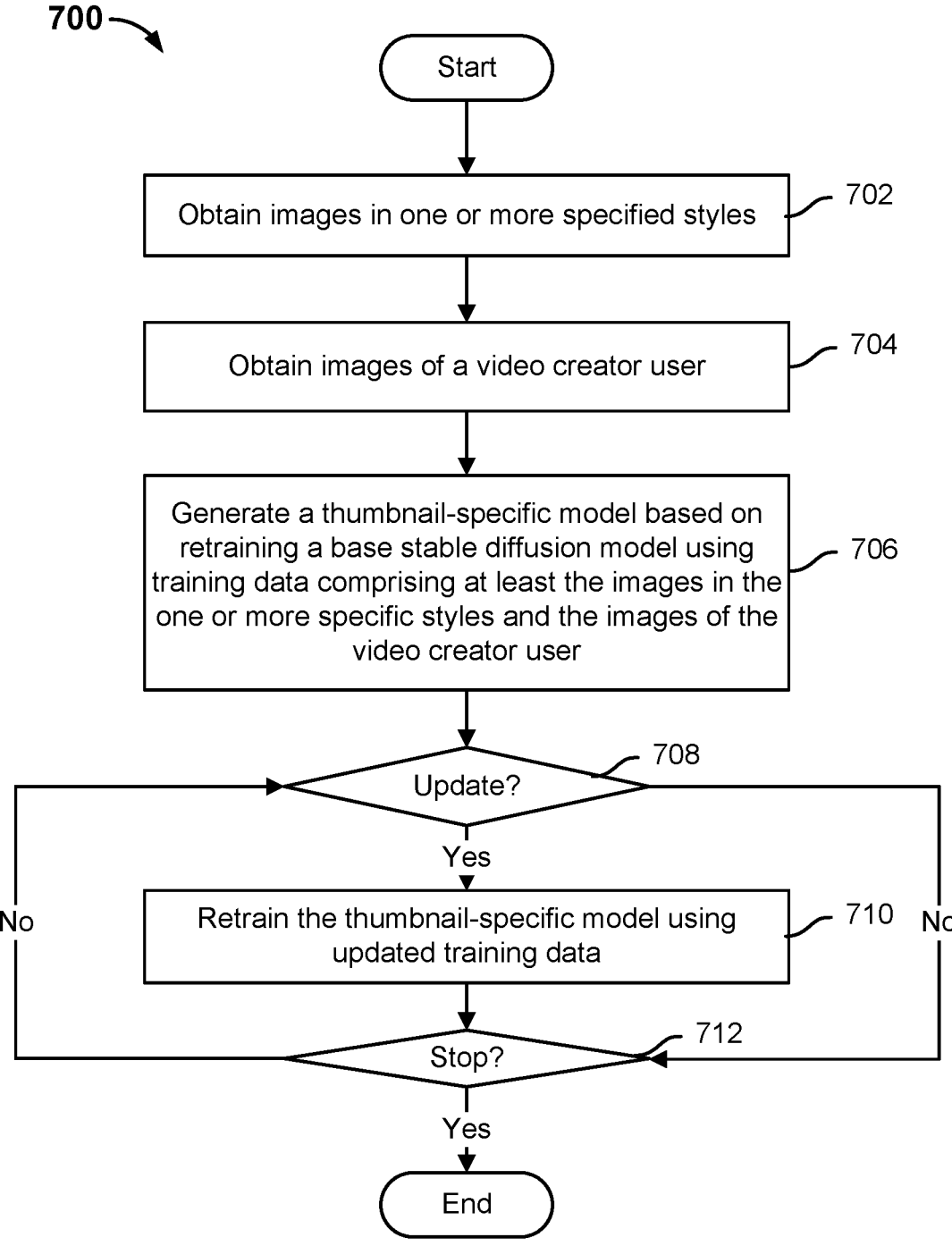
FIG. 7 is a flow diagram showing an example process for training a thumbnail image-specific model in accordance with some embodiments.

FIG. 7 is a flow diagram showing an example process for training a thumbnail image-specific model in accordance with some embodiments. In some embodiments, process 700 may be implemented, at least in part, at video element generator system 104 of FIG. 1.

Process 700 describes a process for training a thumbnail image-specific model to generate thumbnail images for a particular video creator user. Because a video's corresponding thumbnail image typically includes the likeness of the video's corresponding creator user, this model is usually trained on images with the particular video creator user's face and is therefore customized for that video creator user.

At 702, images in one or more specified styles are obtained. The images may be obtained from one or more sources. In various embodiments, thumbnail images associated with historical videos shared at a video platform server can be obtained. In some embodiments, the set of images are selected due to their respective depicted subjects (e.g., features a zoomed in image of a person's face or upper body, a desired ratio of person(s) to background imagery). The obtained images may be of various different styles (e.g., cartoon-like, sketch-like, anime-like, etc.) and may also be labeled according to their respective styles.

At 704, the images of a video creator user are obtained. One example type of images of the video creator user includes the thumbnail images of the creator's historical videos from a video platform server. Other images of the video creator user may be obtained from other sources such as social media networks at which the user has accounts.

At 706, a thumbnail image-specific model is generated based on retraining a base stable diffusion model using training data comprising at least the images in the one or more specified styles. As such, training data that comprises at least the images labeled with specified styles and/or images of the video creator user is used to train a base stable diffusion model. For example, a base stable diffusion model can be a general purpose stable diffusion model that is obtained from a third-party. After being retrained on the labeled images training data, the updated base model will be configured to generate image-based outputs with the likeness of the video creator user in a thumbnail image format in a way that is influenced and constrained by the images of the training data.

At 708, whether updated training data is available to update the thumbnail image-specific model is determined. In the event that updated training data is available to update the thumbnail image-specific model, control is transferred to 710. Otherwise, in the event that updated training data is not available to update the thumbnail image-specific model, control is transferred to 712. Periodically (e.g., every month) and/or in response to an event, the current version of the thumbnail image-specific model can be trained on updated training data. For example, new updated training data (e.g., such as the types that have been obtained via steps 702, 704, and 706) can be obtained from one or more sources.

At 710, the thumbnail image-specific model is retrained using updated training data. The current version of the thumbnail image-specific model can then be retrained on the new training data to result in a new version of the thumbnail image-specific model.

At 712, whether the thumbnail image-specific model is to be continued to be updated is determined. In the event that the thumbnail image-specific model is to be continued to be updated, control is returned to 708. Otherwise, in the event that the thumbnail image-specific model is no longer to be updated, process 700 ends.

While process 700 above describes an example process of customizing a stable diffusion model to a specific video creator user, in some other embodiments, an existing model can be leveraged to generate images for particular video creator users without creating individual models for each video creator user. For example, an existing model may be used and its latent embeddings may be altered or combined with other pre-processed embeddings of a particular video creator user likeness image(s) before image generation. By doing so, the video creator user's images may influence the output of the generation without the need of re-training of "fine-tuning" of the main/existing model, thus allowing customization of output images to include the creator likeness at a larger scale using the main/existing model without creating individual models for each creator user.

FIG. 8 is a flow diagram showing an embodiment of a process for generating candidate video elements. In some embodiments, process 800 is implemented, at least in part, at video element generator system 104 of FIG. 1.

At 802, a requested video element type for a video creator user is received. In various embodiments, a request for candidate video elements that are customized for a specified video creator user is received via a user interface. The requesting user is to submit various parameters for the request in addition to specifying the video creator user, including, for example, a video element type (e.g., a video title, a beat sheet for a video, a thumbnail image for a video, a video concept), a selection of a set of seed videos, and optionally, other constraints on the type of video elements that should be generated. A first example of the user interface includes a graphical user interface that comprises a form that includes input windows, menus, and other selectable elements. A second example of the user interface includes an interactive tool that prompts the requesting user for the parameters of the request. In an example application, a video creator user can make a request via the user interface for new video ideas that they can use to develop/create new videos.

At 804, representative data associated with a set of seed videos is derived. In some embodiments, the set of seed videos are selected as part of the request for the candidate video elements. In some embodiments, the subset of overperforming videos of the video creator user associated with the request and/or the overperforming videos of one or more other creators can be selected to serve as the set of seed videos. For example, the user interface over which the request is made can provide the requesting user one or more other video creator users (e.g., that share a similar audience to the video creator user of the request) to select for the purpose of identifying the overperforming videos of those creators as seed videos. For example, "overperforming" videos can be determined using a process such as process 300 of FIG. 3.

Representative data such as, for example, video titles, beat sheets, loglines, thumbnail images, and video themes/ concepts are derived from the seed videos using techniques such as those described above.

At 806, a prompt is generated based at least in part on the requested video element type, the representative data associated with the set of seed videos, and a random input. Prior to process 800, a video creator user-specific model corresponding to the video creator user of the request has already been created (e.g., using a process such as process 400 of FIG. 4). Furthermore, prior to process 800, a prompt template corresponding to the video creator user-specific model has also been generated (e.g., through manual testing of the model to determine the prompt template that will output the desired outputs). The prompt template to the video creator user-specific model includes variables that are replaceable by the parameters of the request and also a random variable that is to be replaced with a randomly generated value (e.g., that matches the type of the random variable). In some embodiments, to generate a prompt based on the prompt template, the replaceable variables of the prompt template are replaced with the representative data that is derived from the seed videos and the random variable is replaced by a randomly generated value that matches the type of random variable (e.g., a time period, a setting, a location). Other constraining parameters of the request may also be included in the prompt.

At 808, the prompt is input into a large language model that has been customized for the video creator user. The generated prompt is fed into the video creator user-specific model for text-based descriptions of video ideas in the style of the video creator user. In some embodiments, the outputs from the video creator user-specific model are then used to generate respective prompts by populating a prompt template for the next model in the sequence, the video element type-specific model (associated with the type specified in the request) that was generated before process 800. In various embodiments, each prompt template includes a random variable that is replaced with a randomly generated value for each prompt that is derived from the template. The prompt (s) that are generated for the video element type-specific model from the outputs of the video creator user-specific model are then fed into the video element type-specific model for candidate video elements. Because the prompts to the video element type-specific model are constrained by the outputs of the video creator user-specific model, the resulting candidate video elements from the video element type-specific model should be video elements that are in the format of the requested video element type but also in the style of the video creator user of the request.

At 810, a set of candidate video elements that has been output by the large language model is presented. The generated candidate video elements are presented at the user interface for review by the requesting user. The user interface can accept further feedback (e.g., requested modifications) to the presented candidate video elements and then generate additional candidate video elements based on the received feedback by updating the prompts to the model(s).

Figure 9:
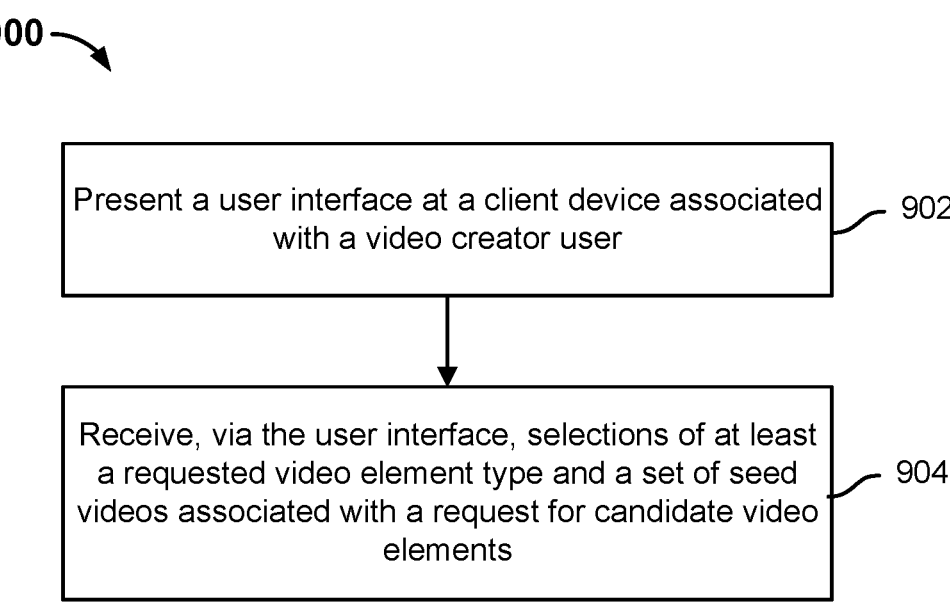
FIG. 9 is a flow diagram showing an example process for receiving a request for candidate video elements in accordance with some embodiments.

FIG. 9 is a flow diagram showing an example process for receiving a request for candidate video elements in accordance with some embodiments. In some embodiments, process 900 is implemented, at least in part, at video element generator system 104 of FIG. 1. In some embodiments, step 802 of process 800 of FIG. 8 may be implemented, at least in part, using process 900.

At 902, a user interface is presented at a client device associated with a video creator user. A user interface that is configured to interact with a video creator user to obtain a request for candidate video elements from the user is presented. In a first example, the user interface comprises an interactive tool interface in which the user can input the parameters of the request in the input window of the interactive tool. In a second example, the user interface comprises one or more forms that include selectable elements in which the user can input the parameters of the request through completing the forms and making selections of the selectable elements.

At 904, selections of at least a video element type and a set of seed videos associated with a request for candidate video elements are received via the user interface. Some parameters of the request that are submitted by the user over the user interface include the type (e.g., beat sheet, video theme, video title, and/or video thumbnail image) of video element for which candidate options are requested as well as the selection of seed videos (e.g., that are created by creators other than the one for which the request is being made) that are to influence the generation of the candidate video elements. Additional user inputs that may be received via the user interface are optional constraints to use to generate the requested video elements.

FIG. 10 is a flow diagram showing an example process for generating a prompt based on a received request for candidate video elements in accordance with some embodiments. In some embodiments, process 1000 is implemented, at least in part, at video element generator system 104 of FIG. 1. In some embodiments, steps 804 and 806 of process 800 of FIG. 8 may be implemented, at least in part, using process 1000.

At 1002, representative data associated with a set of seed videos associated with a request for candidate video elements is received. Examples of representative data associated with the selected set of seed videos may include video titles, beat sheets, loglines, thumbnail images, video themes/concepts, and can be derived using techniques such as those described above.

At 1004, a prompt template that is relevant to the request is determined, wherein the prompt template includes a plurality of variables. The obtained prompt template is the prompt template that was previously generated for the video creator user-specific model (e.g., using a process such as process 400 of FIG. 4) and/or a video element type-specific model (e.g., using the relevant one of process 500 of FIG. 5, process 600 of FIG. 6, and process 700 of FIG. 7) corresponding to the requested type of video element, depending on which model is to be prompted.

At 1006, a prompt is generated based on the prompt template by updating the plurality of variables with input from the video creator user, the representative data associated with the set of seed videos, and a randomized input. To generate a prompt, the previously generated prompt template includes variables, at least some of which are replaced with the parameters input by the video creator user for the request and the representative data derived from the seed video. For example, the parameters input by the video creator user may include one or more of the following: the requested type of video elements, the number of candidate video elements to receive, a submitted video title, a submitted thumbnail image, a submitted beat sheet, and a video theme. Furthermore, a randomly generated value that corresponds to the type of random variable that is included in the prompt template is also included in the prompt. In some embodiments, a prompt template includes a random variable with a specified type (e.g., time period, time of day, setting, location, situation, sub-subject, video length, etc.) and upon the generation of each instance of a prompt from the template, a randomly generated value (e.g., a text string) of the specified variable type is generated to replace the random variable. In a first example, the random value corresponding to the random variable is generated using a cryptographically secure pseudorandom number generator. In a second example, the random value corresponding to the random variable is generated by selecting a different seed value relative to a previous instance. In a third example, the random value corresponding to the random variable is generated based on the current location of the cursor/mouse that is operated by the requesting user. In a fourth example, the generated random value corresponding to the random variable is mapped to one of a set of enumerated values and then the selected enumerated value is included in the prompt in place of the random variable itself.

At 1008, the prompt is fed into at least one of the video creator user-specific model and a video element type-specific model corresponding to the request. The generated prompt is fed into the model (e.g., either the video creator user-specific model or a video element type-specific model) for which the prompt template was created. If a sequence of more than one model is used to generate the requested candidate video elements, then the output from the first model is used with the prompt template of the next model in the sequence to generate a new prompt to feed into the next model (and so forth) to ultimately output the requested one or more candidate video elements, which will be in the format of the requested video element type and also consistent with the creative history of the video creator user's historical videos.

Figure 11:
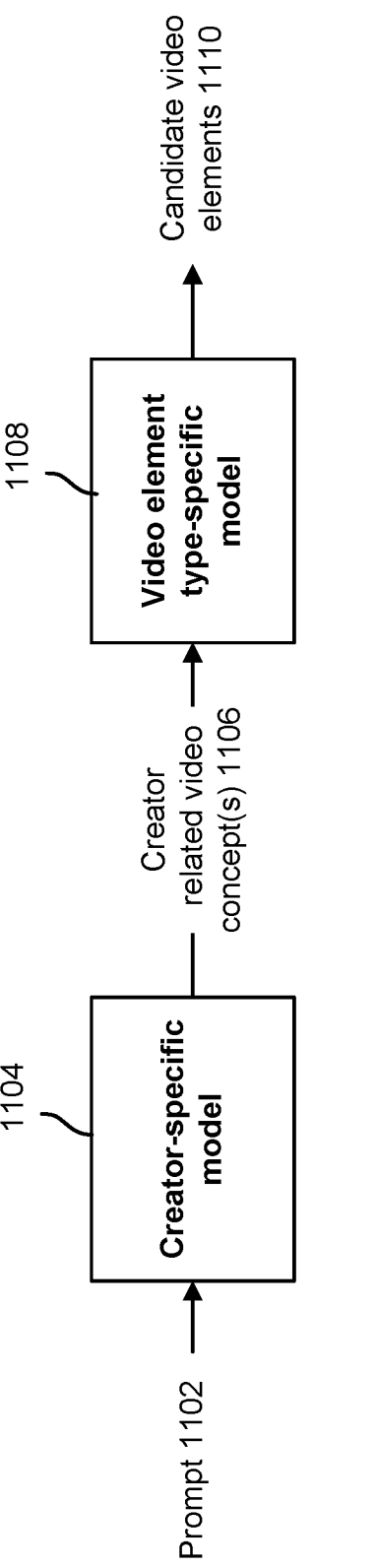
FIG. 11 is a diagram showing an example sequence of models that are used to process a request for candidate video elements in accordance with some embodiments.

FIG. 11 is a diagram showing an example sequence of models that are used to process a request for candidate video elements in accordance with some embodiments. In the example of FIG. 11, prior to receiving a request (over a user interface) for candidate video elements for a particular video creator user, creator-specific model 1104 was generated for that particular video creator user using a process such as process 400 of FIG. 4 and also, video element type-specific model was separately generated using the relevant one of process 500 of FIG. 5, process 600 of FIG. 6, and process 700 of FIG. 7. In response to receiving a request from the video creator user for which creator-specific model 1104 was generated, the prompt template that was determined for creator-specific model 1104 is obtained and prompt 1102, which comprises a text-based prompt, is generated based on the request's parameters, the representative data derived from seed videos associated with the request, and a randomly generated value (e.g., using a process such as process 1000 of FIG. 10). Prompt 1102 is fed into creator-specific model 1104 and creator-specific model 1104 outputs creator related video concept(s) 1106. Creator related video concept(s) 1106 includes one or more text descriptions of video concepts in the style of/are consistent with the video creation history of the video creator user and constrained by the representative data of the seed videos of the prompt as well as the randomly generated value of prompt 1102. In the example of FIG. 11, the prompt template that was determined for video element type-specific model 1108, which is the model that corresponds to the requested type of video element, is obtained and a corresponding prompt is generated based on this prompt template and each of creator related video concept(s) 1106 as well as a randomly generated value (e.g., using a process such as process 1000 of FIG. 10). Each of the prompts that is derived from creator related video concept(s) 1106 is fed into video element type-specific model 1108 to generate a corresponding candidate video element(s) 1110. Candidate video element(s) 1110 comprises video element options that are of the format associated with the requested video element type, influenced by the representative data of the seed videos, influenced by the randomly generated values in the prompts, and are also in the style of/are consistent with the video creation history of the video creator user.

In a specific example, the received request is for new beat sheets for creator BobTheChef. The request also identifies a set of overperforming videos from another creator, CookingWithAlice, to use as inspiration for the generation of beat sheets. As a result, generated prompt 1102 would include at least the representative data that is derived from the overperforming videos of CookingWithAlice and a randomly generated setting of "holiday dinner." This instance of prompt 1102 would then be fed into the instance of creator-specific model 1104 that was generated specifically for creator BobTheChef to receive creator related video concept(s) 1106 that each describes a potential video idea in the style of the historical videos of BobTheChef and influenced by the attributes of the overperforming videos of CookingWithAlice. An example of such a potential video idea for BobTheChef is to "create an instructional video on preparing a Christmas-themed meal for 4 people in a kitchenette." The prompt template of video element type-specific model 1108, which has been trained to specifically output beat sheets, is used to generate prompts based on creator related video concept(s) 1106 and randomly generated video lengths. These prompts are then fed into video element type-specific model 1108 to cause video element type-specific model 1108 to output candidate video element(s) 1110, which in this specific example are beat sheets that each describes the sequence of scenes in a video that BobTheChef can create and that would be consistent with BobTheChef's creative video history, take into the account the request parameters, are influenced by the representative data of the seed videos, and/or are influenced by the randomly generated values of the prompts. The following is an example of a candidate beat sheet that could output by video element type-specific model 1108:

"Scene 1: Introduction (0:00-0:20 minutes)

Start by providing an attention-grabbing introduction that sets up the premise of making a gourmet holiday meal for four people in a small kitchen space.

Scene 2: Showing the appliances and space of the kitchenette (0:20-1:20 minutes)

Show off each appliance and component that will be used in the preparation and cooking process.

Explain the challenge of using a kitchenette versus a larger kitchen and what the kitchenette may lack as compared to a larger kitchen.

Scene 3: Showing the ingredients for the Christmas-themed meal for four (1:20-2:00 minutes)

Discuss about the ingredients that will be used and how they are suited for being cooked in the small kitchen space.

Discuss the special meaning or significance behind any of the dishes that will be cooked.

Scene 4: Preparing the mise en place for the meal (2:00-2:30 minutes)

Show sped-up footage of preparing the ingredients for the cooking process.

Scene 5: Cooking the dishes at the kitchenette (2:30-5:00 minutes)

Show edited footage of the cooking process.

Show interleaved footage of different dishes if they are cooked simultaneously.

Show footage of your expressions throughout your cooking process.

Scene 6: Sitting down to eat with three companions at the dining table (5:00-5:30 minutes)

Show the reactions of your three companions upon seeing the cooked meal.

Show everyone enjoying the meal and clinking glasses."

While not included in the specific example described above, the received request may include the additional constraint of, for example, an input video title to constrain the generation of beat sheets for creator BobTheChef and this parameter would also be included in prompt 1102 to ultimately influence the created beat sheets.

While the example of FIG. 11 shows the sequence/cascade of models in which creator-specific model 1104 is first prompted based on the parameters of the request and then its outputs are used to prompt video element type-specific model 1108, in another example, video element type-specific model 1108 can be prompted first based on the parameters of the request and its outputs are used to prompt creator-specific model 1104. Also, alternatively, creator-specific model 1104 and video element type-specific model 1108 may have been created as a single model.

Figure 12:
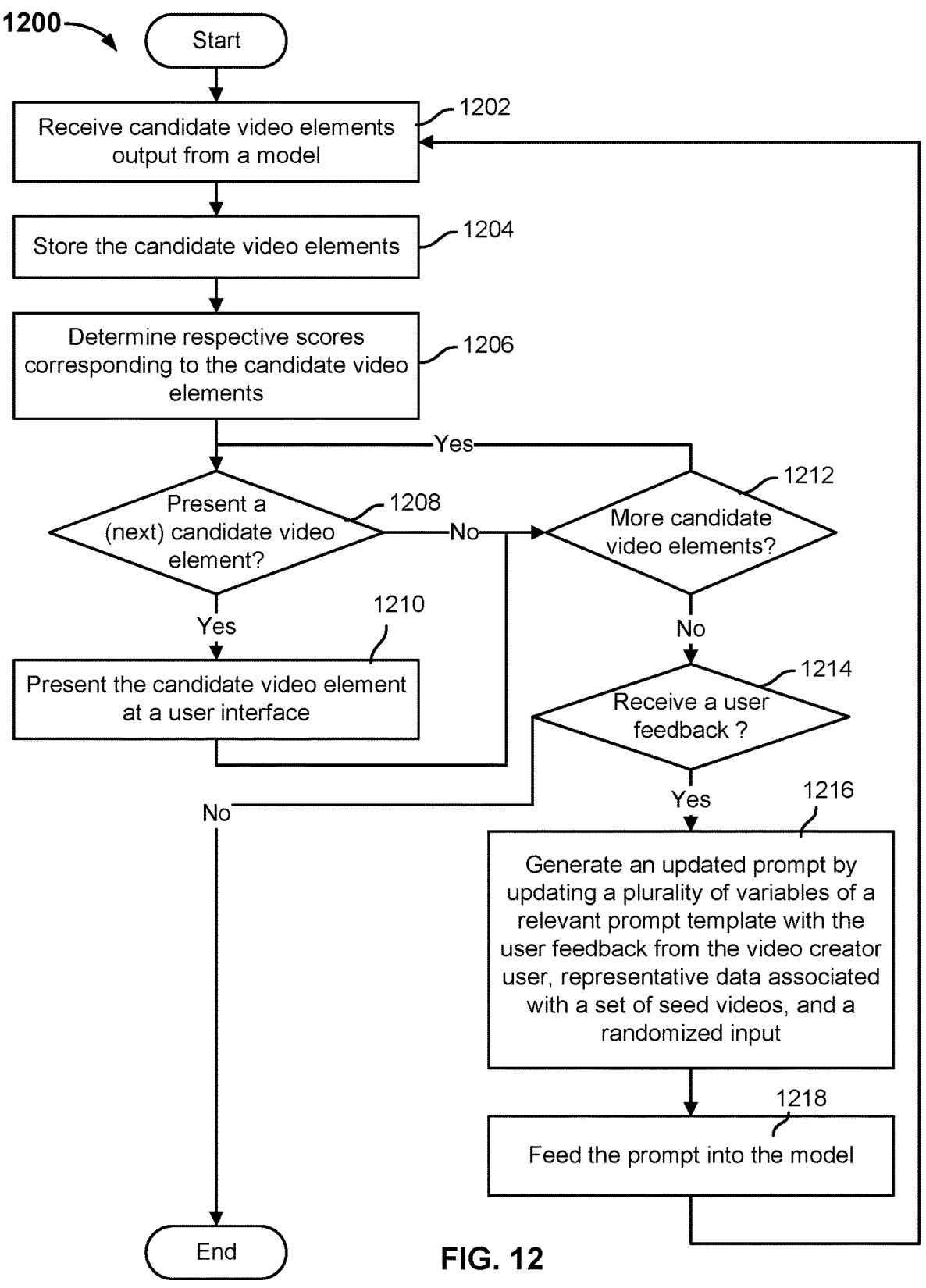
FIG. 12 is a flow diagram showing an example process for receiving user feedback to presented candidate video elements in accordance with some embodiments.

FIG. 12 is a flow diagram showing an example process for receiving user feedback to presented candidate video elements in accordance with some embodiments. In some embodiments, process 1200 is implemented, at least in part, at video element generator system 104 of FIG. 1. In some embodiments, step 810 of process 800 of FIG. 8 may be implemented, at least in part, using process 1200.

Process 1200 describes an example process in which candidate video elements that are received from a model in response to a prompt are first evaluated before they are returned/presented at a user interface to the request and that based on the evaluation, it is possible that one or more candidate video elements may not be presented to the requesting user as a result of the evaluation. Additionally, process 1200 illustrates that user feedback to modify the presented candidate video element(s) can be received and then used to generate an updated prompt to the models to receive a new set of candidate video element(s).

At 1202, candidate video elements output from a model are received. A prompt that was generated based at least in part on a request for candidate video elements was fed into one or more models (e.g., using a process such as process 1000 of FIG. 10). In response, a set of one or more different candidate video element options is received from the model (s).

At 1204, the candidate video elements are stored. The candidate video elements are stored in a way that is associated with the video creator user. In some embodiments, the candidate video elements are temporarily stored for a particular session of generating candidate video elements such that after each session is over, the candidate video elements that were generated during that session are discarded.

At 1206, respective scores corresponding to the candidate video elements are determined. In some embodiments, each candidate video element is evaluated based on several predetermined factors and is assigned a value for each factor that represents the candidate video element's factor-specific score. Then, all the factor-specific scores for the candidate video element are combined (e.g., added) together to determine an overall (e.g., creativity) score for the candidate video element and where the higher the score, the more desirable (e.g., creative) the candidate video element is. The following are example factors:

"Originality": This pertains to the novelty of the content. If the content introduces new ideas, perspectives, or formats that are not encountered among previously generated candidate video elements, it is likely to be deemed creative.

"Novelty": The candidate video element is new or unprecedented. It isn't something that has been repeated or observed before in the given context.

"Flexibility": This refers to the ability of the candidate video element to appeal to a diverse audience or be interpreted in multiple ways. Content that can be enjoyed or understood from various perspectives showcases creativity.

"Elaboration": The depth and detail within the candidate video element can be a sign of creativity. Rich, layered content that unfolds in unexpected ways or reveals deeper meanings upon further inspection can be seen as creative.

"Complexity": A candidate video element that intertwines multiple ideas, themes, or concepts in a coherent manner showcases a sophisticated level of creativity.

"Surprising": A candidate video element that is surprising because they are not what is typically expected.

"Risk-taking": Sometimes, a candidate video element that challenges conventions, pushes boundaries, or takes risks in its execution can be viewed as creative because of its daring nature.

"Transcendence": A candidate video element that elevates a simple idea to something profound, or makes a common theme feel fresh and new, often possesses a creative spark.

"Emotionality": A creative candidate video element often elicits strong emotional responses, whether that's joy, sadness, laughter, or introspection.

In some embodiments, each candidate video element, text-based (e.g., a video title, a video concept, a video beat sheet) or image-based (e.g., thumbnails), for example, is programmatically evaluated by a "panel of judges." In various embodiments, each "judge" is an LLM that has been prepared to adopt different personas via a corresponding system prompt. For example, during inference, an LLM that is to serve as a judge of a candidate video element is configured via a system prompt that fine tunes the LLM for different evaluation specialties and video element types. The various LLM-implemented judges are then managed by an agent process. Alternative to or in addition to the panel of LLM-based judges, a mixture of human experts can be used to score each factor (e.g., originality, novelty, flexibility, etc.) for quality or creativity, and a combined score is generated for each candidate video element.

At 1208, whether a (next) candidate video element is to be presented is determined. In the event that the candidate video element is to be presented, control is transferred to 1210. Otherwise, in the event that the candidate video element is not to be presented, control is transferred to 1212. In some embodiments, whether a candidate video element is to be presented at a user interface in response to the request is determined based on the overall score of the candidate video element as determined at 1206 and also based on the candidate video element's comparison with previously stored candidate video elements for the video creator user. As described above, the candidate video elements that have been generated for a particular video creator user (e.g., during a particular session) can be stored. As such, new candidate video elements that are generated for that same video creator user can be compared to previously stored candidate video elements (e.g., that are associated with the same session) to determine their degrees of similarities (e.g., based on a text-to-text comparison). For example, a candidate video element is determined to be output if it meets the presentation criteria of having a score that is above a score threshold (e.g., to ensure that only high quality/desirable candidate video elements are returned to the requesting user) and also not having more than a predetermined degree of similarity with a stored candidate video element (e.g., to ensure that only candidate video elements that are sufficiently different than previously generated ones are returned to the requesting user).

At 1210, the candidate video element is presented at a user interface. Only if a candidate video element meets the presentation criteria is permitted to be presented at a user interface that is provided to the requesting user. Otherwise, if the candidate video element does not meet the presentation criteria either due to its score being lower than the threshold score and/or having more than a predetermined degree of similarity to a stored candidate video element, then the candidate video element in question is not presented to the requesting user.

At 1212, whether there is at least one more candidate video element to evaluate is determined. In the event that there is at least one more candidate video element to evaluate, control is returned to 1208. Otherwise, in the event that there are no more candidate video elements to evaluate, control is returned to 1214. Each candidate video element that is generated from the same prompt is evaluated to determine whether it should be presented at the user interface.

At 1214, whether a user feedback is received is determined. In the event that user feedback to the presented candidate video elements is received, control is transferred to 1216. Otherwise, in the event that there are no user feedbacks to receive, process 1200 ends. After viewing the presented candidate video elements, the user can input user feedback into the user interface. For example, the user input can include a modifier (e.g., a modifying word or phrase) that will be used to update the candidate video element(s) that were previously presented. In response to receipt of the user feedback, additional candidate video elements are to be generated based on the user feedback. For example, the video creator user may have wanted to change at least one aspect of the candidate video elements and indicated the desired changes as the user feedback. In a specific example, the user feedback in response to the returned candidate video titles may be to text modifiers of the tone, setting, language, and/or format of the returned candidate video titles. In some embodiments, the user feedback and the candidate video elements to which the user feedback is directed are included in the training data that is used to update the model(s) at a subsequent instance of training the model(s).

At 1216, an updated prompt is generated by updating a plurality of variables of a relevant prompt template with the user feedback from the video creator user, representative data associated with a set of seed videos, and a randomized input. In some embodiments, the prompt template that corresponds to the video creator user-specific model and/or the video element type-specific model is used to generate a prompt with the candidate video element for which user feedback was received, the user provided feedback, the parameters of the original request, the representative data associated with a set of seed videos associated with the request, and a new, randomly generated value.

At 1218, the prompt is fed into the model. The updated prompt is then fed into the corresponding model(s) to obtain a new and different set of candidate video elements that has taken into account the user feedback. The resulting candidate video elements are then evaluated for which of them should be presented at the user interface starting at step 1202.

FIGS. 13A and 13B describe examples of a user interface for obtaining the submission of a request for candidate video elements for a video creator user. In particular, FIGS. 13A and 13B show examples of a user interface that is in an interactive tool format in which the interactive tool provides a series of questions to the requesting user and then determines the parameters to the request based on the user provided responses to the questions. In FIG. 13A, user interface 1302 shows an interactive tool that is prompting the user to select options for parameters for the type of candidate video elements that are being requested. The video creator user for which the request is generated is "BobTheChef" because the account login credentials of "BobTheChef" had been used to access this user interface. At message 1304, the interactive tool is asking the user (e.g., the video creator user themself or a representative thereof) if they have any initial ideas or concepts to constrain the generation of candidate video elements. In response to the user's response of "No clue, you tell me!" the interactive tool provides options of categories of seed ("inspiration") videos in message 1306 that can be used to influence the generation of candidate video elements.

In FIG. 13B, user interface 1350 shows the continuation of the chat that had started in user interface 1302 of FIG. 13A. In response to the user's selection of "My best performing videos" to the interactive tool's prompt to select a category of seed ("inspiration") videos in message 1308, the interactive tool had identified 40 of Bob TheChef's best performing videos (e.g., 40 of the creator's "overperforming" videos) and had also analyzed the 40 videos to provide three of their most common topics. In message 1310, the interactive tool provides these three most common topics as options from which the user can select to view more detailed information on the selected topic. The interactive tool can continue to prompt selections and input values from the user in this manner to obtain additional parameters (e.g., seed videos and other user input to constrain the candidate video elements to include in the request until a stop condition is met (e.g., the user no longer wishes to provide additional input before receiving the candidate video elements, the interactive tool already has received a predetermined number of user inputs, etc.)). As described above in process 1000 of FIG. 10, representative data can be determined from the selected seed videos, which will be used along with the other user inputs for the request (e.g., the desired type of video element type) to generate prompt(s) that will be fed into at least the previously determined video creator user-specific (e.g., BobTheChef-specific) model to obtain candidate video elements, which will then be evaluated (e.g., using a process such as process 1200 of FIG. 12) before they can be presented to the requesting user at a user interface such as FIGS. 13A and 13B. While not shown in FIGS. 13A and 13B, the user can also provide feedback (e.g., desired modifications) to the presented candidate video elements via an interactive tool user interface and receive new candidate video elements that are determined based on the provided user feedback, such as described in process 1200 of FIG. 12.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive a requested video element type for a video creator user;
      derive representative data associated with a set of seed videos;
      generate a prompt based at least in part on the requested video element type, the representative data associated with the set of seed videos, and a random input, wherein to generate the prompt comprises to:
         determine a prompt template corresponding to a large language model that has been customized for the video creator user;
         generate the random input corresponding to a random variable included in the prompt template; and
         update at least a variable included in the prompt template based at least in part on the representative data associated with the set of seed videos;
      input the prompt into the large language model that has been customized for the video creator user; and
      present a set of candidate video elements that has been output by the large language model; and
   a memory coupled to the processor and configured to provide the processor with instructions.

2. The system of claim 1, wherein the processor is further configured to:

receive identifying information associated with a set of videos;

determine respective view counts associated with the set of videos;

determine an average view count based at least in part on the respective view counts; and determine a subset of overperforming videos by comparing the respective view counts to the average view count, wherein the set of seed videos comprises the subset of overperforming videos.

3. The system of claim 1, wherein the processor is further to:

obtain profile information associated with the video creator user;

determine a set of reference videos associated with the video creator user;

derive loglines from the set of reference videos; and determine a set of cast members from the set of reference videos, wherein the large language model has been trained based at least in part on training data comprising the profile information, the loglines, and the set of cast members.

4. The system of claim 1, wherein the representative data associated with the set of seed videos comprises one or more of the following: video titles, beat sheets, loglines, thumbnail images, video themes, and video concepts.

5. The system of claim 1, wherein the random input is generated using a cryptographically secure pseudorandom number generator.

6. The system of claim 1, wherein the random input is generated using a current location of a cursor.

7. The system of claim 1, wherein the processor is further configured to determine a respective creativity score associated with a candidate video element.

8. The system of claim 7, wherein the processor is further configured to compare the candidate video element to stored candidate video elements associated with the video creator user.

9. The system of claim 8, wherein the processor is configured to determine whether to present the candidate video element based at least in part on the respective creativity score and the comparison.

10. The system of claim 1, wherein the processor is further configured to:

receive a user feedback to a candidate video element;

generate a new prompt based at least in part on the candidate video element and the user feedback;

input the new prompt into the large language model that has been customized for the video creator user; and present a new set of candidate video elements that has been output by the large language model.

11. The system of claim 10, wherein the processor is further configured to update the large language model that has been customized for the video creator user based at least in part on the user feedback.

12. The system of claim 1, wherein the requested video element type comprises one or more of the following: a video title, a thumbnail image, and a beat sheet.

13. A method, comprising:

receiving a requested video element type for a video creator user;

deriving representative data associated with a set of seed videos;

generating a prompt based at least in part on the requested video element type, the representative data associated with the set of seed videos, and a random input, wherein generating the prompt comprises:

determining a prompt template corresponding to a large language model that has been customized for the video creator user;

generating the random input corresponding to a random variable included in the prompt template; and updating at least a variable included in the prompt template based at least in part on the representative data associated with the set of seed videos;

inputting the prompt into the large language model that has been customized for the video creator user; and presenting a set of candidate video elements that has been output by the large language model.

14. The method of claim 13, further comprising:

receiving identifying information associated with a set of videos;

determining respective view counts associated with the set of videos;

determining an average view count based at least in part on the respective view counts; and determining a subset of overperforming videos by comparing the respective view counts to the average view count, wherein the set of seed videos comprises the subset of overperforming videos.

15. The method of claim 13, further comprising:

obtaining profile information associated with the video creator user;

determining a set of reference videos associated with the video creator user;

deriving loglines from the set of reference videos; and determining a set of cast members from the set of reference videos, wherein the large language model has been trained based at least in part on training data comprising the profile information, the loglines, and the set of cast members.

16. The method of claim 13, wherein the representative data associated with the set of seed videos comprises one or more of the following: video titles, beat sheets, loglines, thumbnail images, video themes, and video concepts.

17. The method of claim 13, wherein the random input is generated using a cryptographically secure pseudorandom number generator.

18. A computer program product embodied in a non-transitory computer readable medium and comprising computer instructions for:

receiving a requested video element type for a video creator user;

deriving representative data associated with a set of seed videos;

generating a prompt based at least in part on the requested video element type, the representative data associated with the set of seed videos, and a random input, wherein generating the prompt comprises:

determining a prompt template corresponding to a large language model that has been customized for the video creator user;

generating the random input corresponding to a random variable included in the prompt template; and updating at least a variable included in the prompt template based at least in part on the representative data associated with the set of seed videos;

inputting the prompt into the large language model that has been customized for the video creator user; and presenting a set of candidate video elements that has been output by the large language model.

\* \* \* \* \*